(12) United States Patent
Gonzalez

(10) Patent No.: US 10,364,843 B2
(45) Date of Patent: Jul. 30, 2019

(54) METHODS UTILIZING A BEARING ASSEMBLY HAVING ENHANCED SELECTED SUPPORT FOR NONUNIFORM LOADS

(71) Applicant: US SYNTHETIC CORPORATION, Orem, UT (US)

(72) Inventor: Jair Jahaziel Gonzalez, Provo, UT (US)

(73) Assignee: US SYNTHETIC CORPORATION, Orem, UT (US)

(*) Notice: Subject to any disclaimer, the term of this patent is extended or adjusted under 35 U.S.C. 154(b) by 0 days.

(21) Appl. No.: 15/729,868

(22) Filed: Oct. 11, 2017

(65) Prior Publication Data

US 2018/0045245 A1  Feb. 15, 2018

Related U.S. Application Data

(63) Continuation of application No. 15/274,103, filed on Sep. 23, 2016, now Pat. No. 9,816,554, which is a (Continued)

(51) Int. Cl.
| | |
|---|---|
| *F16C 33/04* | (2006.01) |
| *F16C 17/02* | (2006.01) |
| *F16C 33/10* | (2006.01) |
| *F16C 33/26* | (2006.01) |
| *E21B 4/00* | (2006.01) |

(Continued)

(52) U.S. Cl.
CPC ............ *F16C 33/043* (2013.01); *E21B 4/003* (2013.01); *E21B 4/02* (2013.01); *E21B 10/00* (2013.01); *F16C 17/02* (2013.01); *F16C 17/04* (2013.01); *F16C 17/12* (2013.01); *F16C 33/108* (2013.01); *F16C 33/109* (2013.01); *F16C 33/1075* (2013.01); *F16C 33/26* (2013.01); *F16C 2206/04* (2013.01); *F16C 2206/40* (2013.01); *F16C 2352/00* (2013.01)

(58) Field of Classification Search
CPC .... F16C 2352/00; F16C 33/043; F16C 33/26; F16C 17/02; F16C 17/04; F16C 2206/04; F16C 2206/40; F16C 17/12; F16C 33/1075; F16C 33/108; F16C 33/109; E21B 4/003; E21B 10/22; E21B 10/23; E21B 4/02; E21B 10/243
See application file for complete search history.

(56) References Cited

U.S. PATENT DOCUMENTS

| | | |
|---|---|---|
| 4,732,491 A | 3/1988 | Geczy |
| 4,892,420 A | 1/1990 | Kruger |

(Continued)

OTHER PUBLICATIONS

U.S. Appl. No. 13/480,932, filed May 25, 2012, Tulett et al.

(Continued)

*Primary Examiner* — Alan B Waits
(74) *Attorney, Agent, or Firm* — Dorsey & Whitney LLP

(57) ABSTRACT

Embodiments of the invention are directed to bearing assemblies configured to effectively carry nonuniform loads, bearing apparatuses including such bearing assemblies, and methods of operating such bearing assemblies and apparatuses. In an embodiment, under some operational conditions, one or more portions of the bearing assemblies and bearing apparatus may be preferentially loaded, such as to carry preferentially higher loads (e.g., radial and/or axial loads) than other portion(s) of the bearing assemblies and bearing apparatus.

20 Claims, 10 Drawing Sheets

Related U.S. Application Data continuation of application No. 14/095,014, filed on Dec. 3, 2013, now Pat. No. 9,488,221.

(51) Int. Cl.
  *F16C 17/04* (2006.01)
  *F16C 17/12* (2006.01)
  *E21B 4/02* (2006.01)
  *E21B 10/00* (2006.01)

(56) References Cited

U.S. PATENT DOCUMENTS

| | | | |
|---|---|---|---|
| 5,364,192 | A | 11/1994 | Damm et al. |
| 7,866,418 | B2 | 1/2011 | Bertagnolli et al. |
| 7,878,777 | B2 | 2/2011 | Iwanami et al. |
| 7,896,551 | B2 | 3/2011 | Cooley et al. |
| 7,998,573 | B2 | 8/2011 | Qian et al. |
| 8,034,136 | B2 | 10/2011 | Sani |
| 8,066,087 | B2 | 11/2011 | Griffo et al. |
| 8,236,074 | B1 | 8/2012 | Bertagnolli et al. |
| 8,277,124 | B2 | 10/2012 | Sexton et al. |
| 8,328,891 | B2 | 12/2012 | Zhang et al. |
| 8,480,304 | B1 | 7/2013 | Cooley et al. |
| 8,496,075 | B2 | 7/2013 | Scott et al. |
| 8,616,770 | B2 | 12/2013 | Sexton et al. |
| 8,646,981 | B2 | 2/2014 | Peterson et al. |
| 8,651,743 | B2 | 2/2014 | Peterson et al. |
| 9,488,221 | B2 | 11/2016 | Gonzalez |
| 2008/0142276 | A1 | 6/2008 | Griffo et al. |
| 2010/0218995 | A1 | 9/2010 | Sexton et al. |
| 2012/0281938 | A1 | 11/2012 | Peterson et al. |
| 2013/0182980 | A1 | 7/2013 | Peterson et al. |
| 2014/0023301 | A1 | 1/2014 | Sexton et al. |
| 2014/0072249 | A1 | 3/2014 | Sexton et al. |
| 2014/0348452 | A1 | 11/2014 | Gonzalez et al. |
| 2015/0152914 | A1 | 6/2015 | Gonzalez |
| 2017/0009808 | A1 | 1/2017 | Gonzalez |

OTHER PUBLICATIONS

U.S. Appl. No. 13/899,785, filed May 22, 2013, Gonzalez et al.
U.S. Appl. No. 14/095,014, filed Dec. 3, 2013, Gonzalez.
U.S. Appl. No. 15/274,103, filed Sep. 23, 2016, Gonzalez.
International Search Report and Written Opinion from International Application No. PCT/US2014/067484 dated Feb. 11, 2015.
U.S. Appl. No. 14/095,014, Jan. 6, 2015, Restriction Requirement.
U.S. Appl. No. 14/095,014, Mar. 19, 2015, Office Action.
U.S. Appl. No. 14/095,014, Jul. 27, 2015, Office Action.
U.S. Appl. No. 14/095,014, Oct. 5, 2015, Advisory Action.
U.S. Appl. No. 14/095,014, Nov. 27, 2015, Office Action.
U.S. Appl. No. 14/095,014, Apr. 14, 2016, Office Action.
U.S. Appl. No. 14/095,014, Jun. 1, 2016, Interview Summary.
U.S. Appl. No. 14/095,014, Jun. 23, 2016, Notice of Allowance.
U.S. Appl. No. 14/095,014, Oct. 19, 2016, Issue Notification.
U.S. Appl. No. 15/274,103, Jul. 13, 2017, Notice of Allowance.

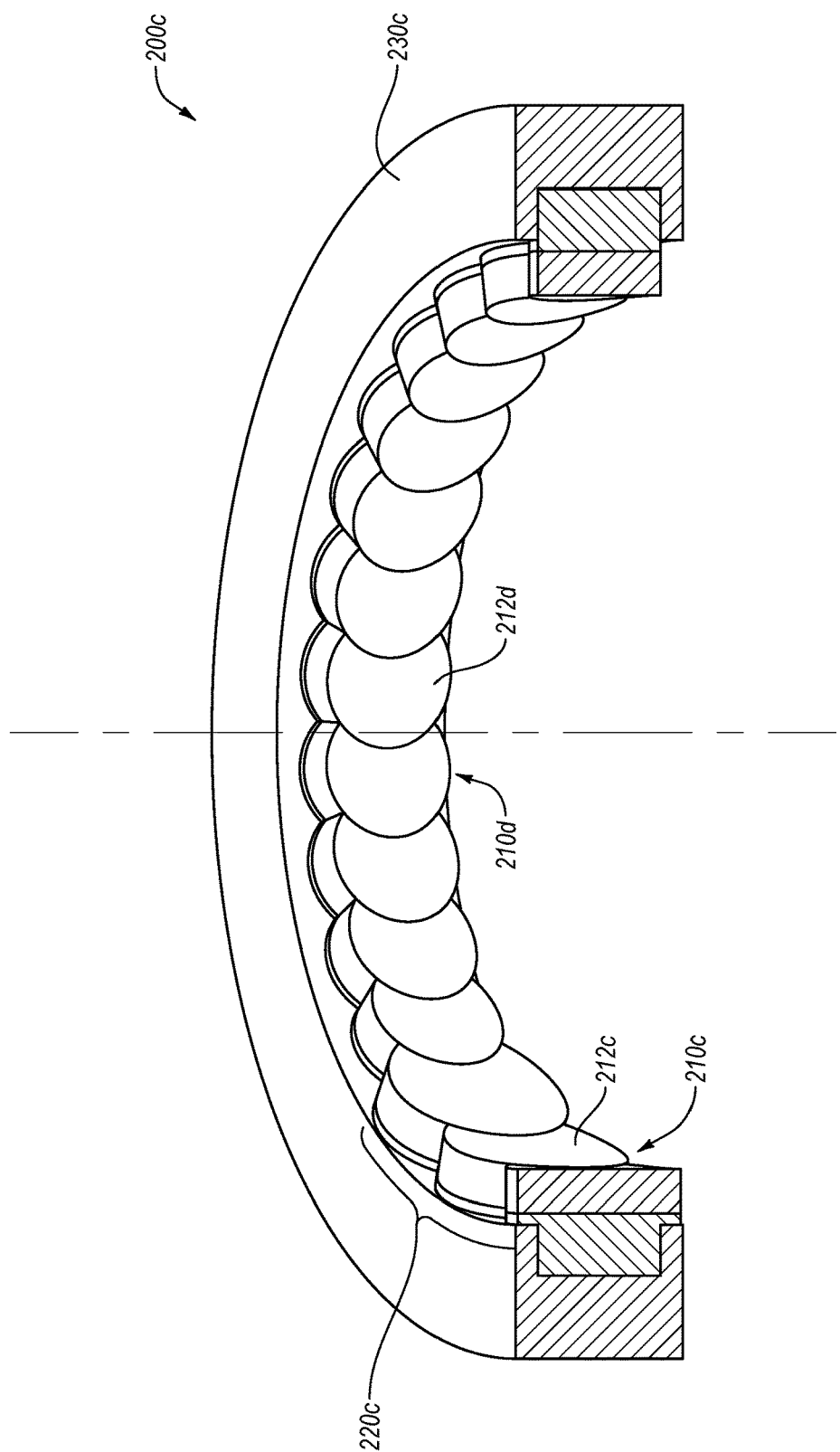

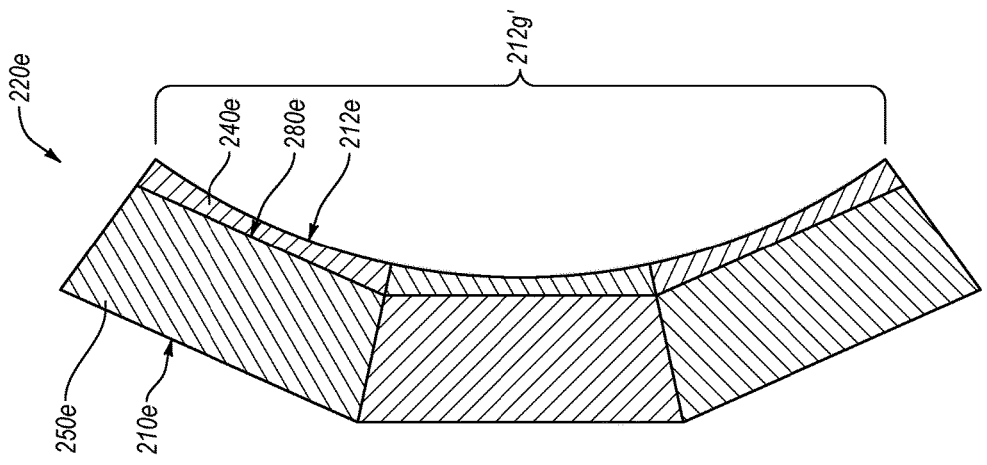
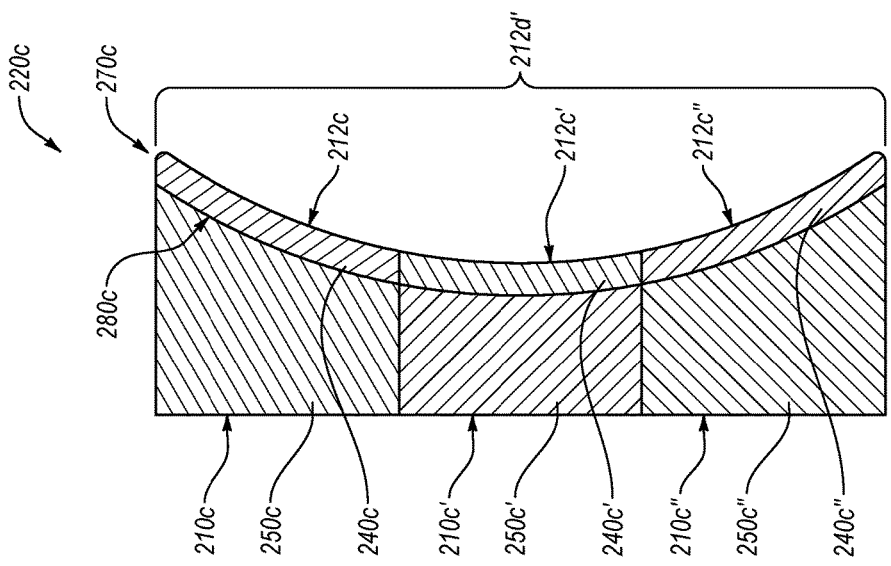
FIG. 3B
FIG. 3A

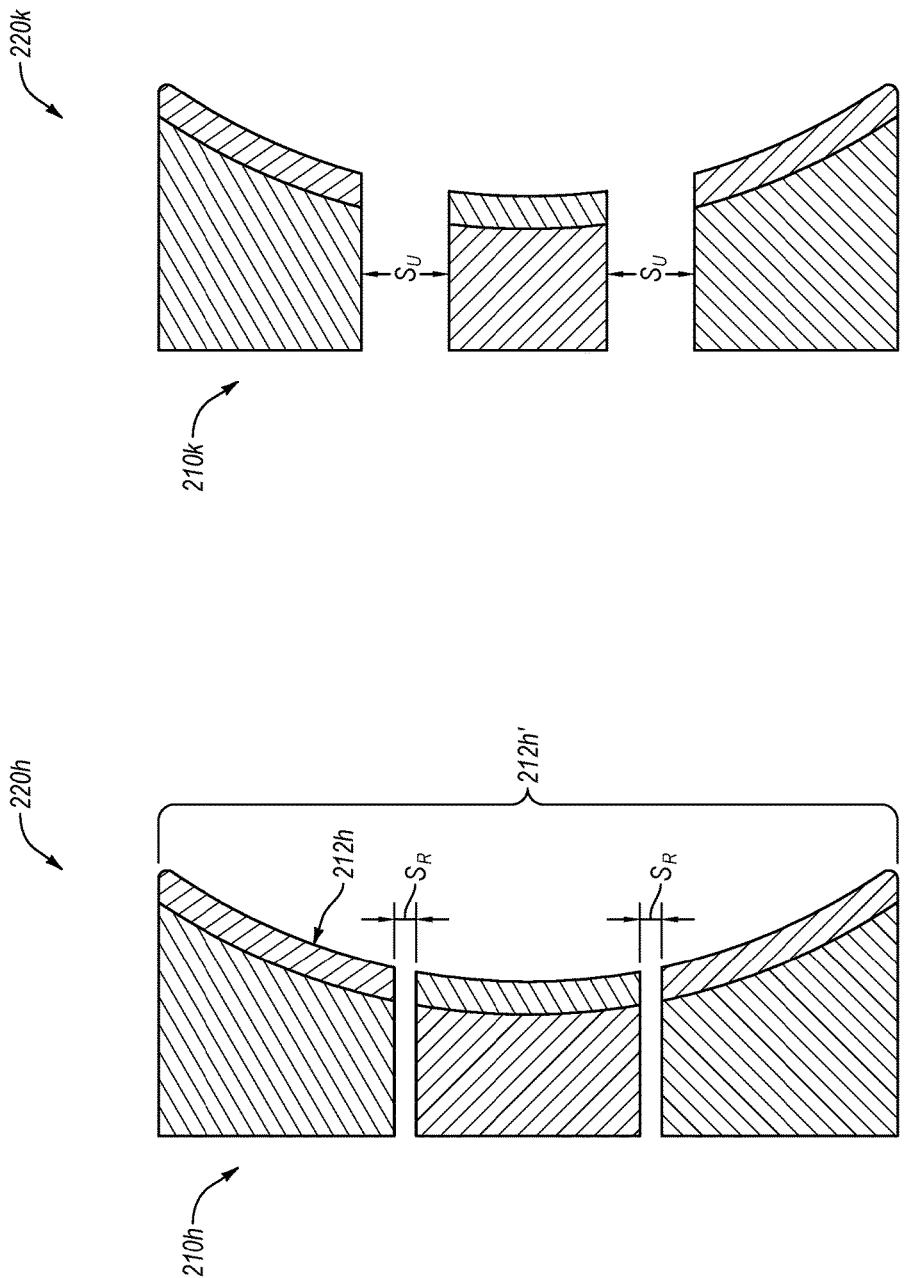

METHODS UTILIZING A BEARING ASSEMBLY HAVING ENHANCED SELECTED SUPPORT FOR NONUNIFORM LOADS

CROSS-REFERENCE TO RELATED APPLICATIONS

This application is a continuation of U.S. patent application Ser. No. 15/274,103 filed on 23 Sep. 2016, which is a continuation of U.S. patent application Ser. No. 14/095,014 filed on 3 Dec. 2013. The disclosure of each of the foregoing applications is incorporated herein, in its entirety, by this reference.

BACKGROUND

Subterranean drilling systems that employ downhole drilling motors are commonly used for drilling boreholes in the earth for oil and gas exploration and production. A subterranean drilling system typically includes a downhole drilling motor that is operably connected to an output shaft. Bearing apparatuses (e.g., thrust, radial, tapered, and other types of bearings) also may be operably coupled to the downhole drilling motor. A rotary drill bit configured to engage a subterranean formation and drill a borehole is connected to the output shaft. As the borehole is drilled with the rotary drill bit, pipe sections may be connected to the subterranean drilling system to form a drill string capable of progressively drilling the borehole to a greater depth within the earth.

A typical bearing apparatus includes a stator that does not rotate and a rotor that is attached to the output shaft and rotates with the output shaft. The stator and rotor each includes a plurality of bearing elements, which may be fabricated from polycrystalline diamond compacts ("PDCs") that provide diamond bearing surfaces that bear against each other during use.

The operational lifetime of the bearing apparatuses often determines the useful life of the subterranean drilling system. Therefore, manufacturers and users of subterranean drilling systems continue to seek improved bearing apparatuses to extend the useful life of such bearing apparatuses.

SUMMARY

Embodiments of the invention are directed to bearing assemblies configured to effectively carry nonuniform loads, bearing apparatuses including such bearing assemblies, and methods of operating such bearing assemblies and apparatuses. In an embodiment, under some operational conditions, one or more portions of the bearing assemblies and bearing apparatus may be preferentially loaded, such as to carry preferentially higher loads (e.g., radial and/or axial loads) than other portion(s) of the bearing assemblies and bearing apparatus. Accordingly, one or more embodiments include a bearing apparatus, which may include first and second bearing assemblies (e.g., a stator and a rotor) configured to engage one another, and any of which may have one or more portions capable of carrying higher loads than other areas or portions thereof.

An embodiment includes a bearing assembly that includes a support ring and a plurality of first superhard bearing elements secured to or within the support ring. The plurality of first superhard bearing elements are distributed about an axis. Each of the plurality of first superhard bearing elements has a superhard material that includes a first superhard bearing surface. Moreover, the plurality of first superhard bearing elements defines an unreinforced portion. Additionally, the bearing assembly includes a plurality of second superhard bearing elements mounted to the support ring. The plurality of second superhard bearing elements are distributed about the axis and define a reinforced portion that has a span angle about the axis. Furthermore, each of the plurality of second superhard bearing elements has a superhard material that include a second superhard bearing surface. The second superhard bearing surfaces collectively define a reinforced bearing surface. In addition, the reinforced portion has a bearing surface density greater than the unreinforced portion.

Another embodiment includes a bearing apparatus that has a first bearing assembly, which includes a plurality of first superhard bearing elements. Each of the plurality of first superhard bearing elements includes a superhard material having a first superhard bearing surface. The bearing apparatus also includes a second bearing assembly that has a plurality of second superhard bearing elements distributed about an axis. Each of the second plurality of superhard bearing elements includes a superhard material having a second superhard bearing surface. The second bearing assembly also includes one or more third superhard bearing elements distributed about the axis and defining a reinforced portion that has a span angle of less than 72° about the axis. Each of the plurality of third superhard bearing elements has a superhard material including a third superhard bearing surface. The second and third bearing surfaces are positioned to slidingly engage the first bearing surfaces during operation. Each of the plurality of third superhard bearing elements are sized configured to carry more load than any one of the plurality of second superhard bearings. Moreover, a second support ring is secured to the plurality second superhard bearing elements and to the plurality of third superhard bearing elements.

Embodiments also include a method of operating a bearing apparatus. The method includes providing a first bearing assembly having one or more first superhard bearing surfaces and rotatably engaging a second bearing assembly with the first bearing assembly. The second bearing assembly includes one or more second superhard bearing surfaces defining a reinforced portion and one or more third superhard bearing surfaces defining an unreinforced portion. The reinforced portion has a higher bearing surface density than the unreinforced portion. In addition, the method includes supporting a first portion of a total load by the reinforced portion and a second portion of the total load by the unreinforced portion. The first portion has a first percentage per degree load and the second portion has a second percentage per degree load. Moreover, the first percentage is greater than the second percentage.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments, wherein identical reference numerals refer to identical or similar elements or features in different views or embodiments shown in the drawings.

FIG. 2C is a cross-sectional view of a radial bearing assembly according to another embodiment;

FIG. 3A is a cross-sectional view of a reinforced portion of a radial bearing assembly according to an embodiment;

FIG. 3B is a cross-sectional view of a reinforced portion of a radial bearing assembly according to another embodiment;

FIG. 3C is a cross-sectional view of a reinforced portion of a radial bearing assembly according to yet another embodiment;

FIG. 3D is a cross-sectional view of an unreinforced portion of a radial bearing assembly according to an embodiment;

DETAILED DESCRIPTION

Figure 1:
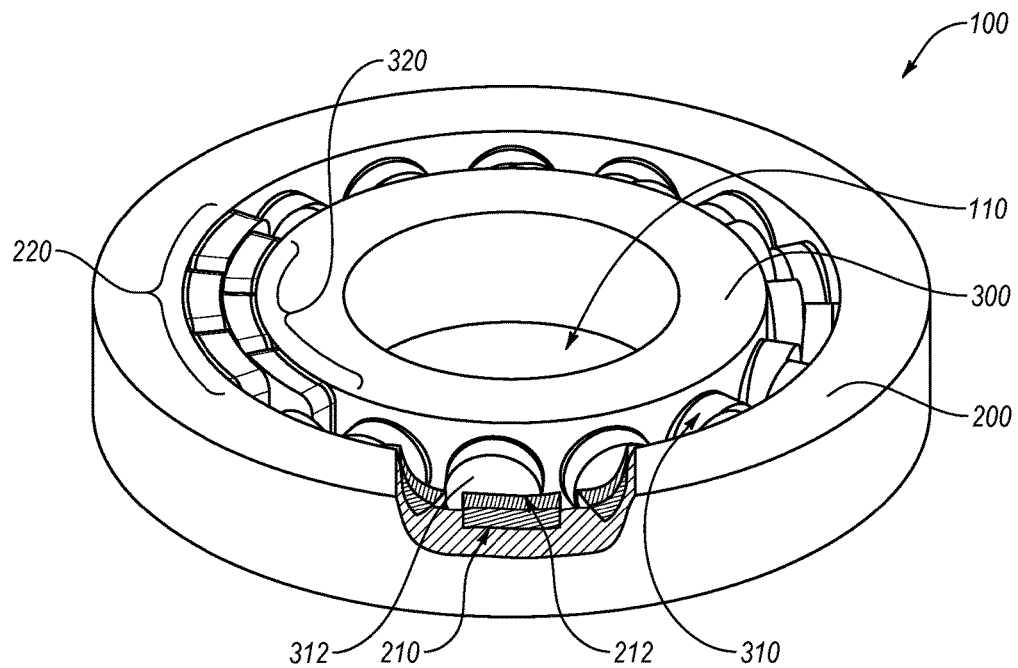
FIG. 1 is an isometric view of a radial bearing apparatus according to an embodiment.

Embodiments of the invention are directed to bearing assemblies configured to effectively carry nonuniform loads, bearing apparatuses including such bearing assemblies, and methods of operating such bearing assemblies and apparatuses. In an embodiment, under some operational conditions, one or more portions of the bearing assemblies and bearing apparatus may be preferentially loaded, such as to carry preferentially higher loads (e.g., radial and/or axial loads) than other portion(s) of the bearing assemblies and bearing apparatus. Accordingly, one or more embodiments include a bearing apparatus, which may include first and second bearing assemblies (e.g., a stator and a rotor) configured to engage one another, and any of which may have one or more portions capable of carrying higher loads than other areas or portions thereof.

Furthermore, in some instances, the portion capable of carrying higher loads can also facilitate hydrodynamic operation of the bearing apparatus. In particular, such portion may include a continuous or substantially continuous bearing surface. For example, one or more of the bearing assemblies may include one or more of a reinforced portion with bearing surface(s) that may have an area, bearing surface density, a polycrystalline diamond table thickness, or performance characteristic that is greater or different from the span of other bearing surfaces in another equal angular portion on such bearing assemblies. Such bearing surface may include a single bearing element of suitable shape and/or size or multiple bearing elements of suitable shape and size.

In addition, some or all of the bearing elements of the first and/or second bearing assemblies may be superhard bearing elements. As used herein, a "superhard bearing element" is a bearing element including a bearing surface that is made from a material exhibiting a hardness that is at least as hard as tungsten carbide. In any of the embodiments disclosed herein, the superhard bearing elements may include one or more superhard materials, such as polycrystalline diamond, polycrystalline cubic boron nitride, silicon carbide, tungsten carbide, or any combination of the foregoing superhard materials.

In some instances, bearing apparatuses and bearing assemblies may include one or more portions that incorporate more superhard material and/or superhard bearing elements than other portions thereof. Generally, the bearing apparatus may include any suitable number of bearing assemblies. In one example, the bearing apparatus includes two bearing assemblies, as further described below. Hence, embodiments may include one or more bearing assemblies that may have one or more portions with a greater percentage or amount of a total bearing surface area than other equal angular portions of such bearing assemblies.

In some embodiments, the superhard bearing elements may collectively form or define the total bearing surface of the bearing assembly. For example, the bearing assembly may be a stator or a rotor of the bearing apparatus. The total bearing surface of the stator may be stationary, while the total bearing surface of the rotor may rotate (e.g., may be connected to and rotate together with a shaft). In any event, however, the total bearing surfaces of the stator and rotor may rotate or move relative to one another and may carry the load experienced by the bearing apparatus. As such, increasing a relative percentage of the total bearing surface located in one or more portions of either stationary or rotating bearing assembly may allow such portions to carry a greater load than other equal angular portions of the same bearing assembly.

As mentioned above, in some instances, one or more radial bearing assemblies of a radial bearing apparatus may include one or more portions that have a greater percentage of the total bearing surface allocated thereto, which may allow the radial bearing apparatus to carry an unbalanced load. For instance, the radial bearing apparatus may support a horizontally oriented shaft, which may apply more force onto a lower portion of the radial bearing apparatus, such as onto a lower portion of a stationary radial bearing assembly. In an embodiment, the lower portion of the radial bearing assembly may have a greater percentage of the total bearing surface than any other similarly sized portion of the radial bearing assembly. Accordingly, the lower portion of the radial bearing assembly may carry a higher load than other portions (e.g., in addition to the load experienced by all of the portions of the radial bearing assembly, the lower portion may carry the weight of the shaft).

FIG. 1 illustrates an embodiment of a radial bearing apparatus 100, which includes a first radial bearing assembly 200 and a second radial bearing assembly 300. The first and second radial bearing assemblies 200, 300 may include corresponding superhard bearing elements 210, 310. Generally, the second radial bearing assembly 300 may be rotatably positioned inside the first radial bearing assembly 200. More specifically, the superhard bearing elements 210, 310 may have corresponding bearing surfaces 212, 312 that may face an engage one another in a manner that allows the first and second radial bearing assemblies 200, 300 to rotate relative to each other, while limiting or preventing lateral movement thereof.

Collectively, the bearing surfaces 212 may collectively form or defined a total bearing surface of the first radial bearing assembly 200. In other words, the total bearing surface may include multiple bearing surfaces that may be separated one from another and/or some of which may be substantially un-separated from one another (i.e., forming substantially continuous or substantially uninterrupted surface that include multiple individual bearing surfaces). Furthermore, it should be appreciated that the total bearing surface may be sized and configured to engage (e.g., slidingly engage) one or more bearing surfaces of another (second) radial bearing assembly. Likewise, the bearing surfaces 312 may collectively form or define a total bearing surface of the second radial bearing assembly 300. In any event, the bearing surfaces 212 (and the total bearing surface of the first radial bearing assembly 200) may rotate relative to the bearing surfaces 312 (and the total bearing surface of the second radial bearing assembly 300) in the manner described above. It should be also appreciated that the first radial bearing assembly 200 may be a stator, while the second radial bearing assembly 300 may be a rotor or vice versa.

In an embodiment, a shaft (e.g., a drill shaft) or other machine component or element may pass into or through an opening 110 of the radial bearing apparatus 100 and may be secured to the second radial bearing assembly 300. The opening 110 may have any suitable shape, such as circular, square, rectangular, etc. In any event, in one embodiment, the shaft may be rotated together with the second radial bearing assembly 300, while the first radial bearing assembly 200 may remain stationary. For instance, the first radial bearing assembly 200 may be connected to and/or securing within a housing and may remain stationary relative thereto as well as relative to the shaft.

As described above, the first radial bearing assembly 200 and/or the second radial bearing assembly 300 may include one or more portions that may carry higher load than other portions. For example, the first radial bearing assembly 200 may include a reinforced portion 220 that may have a greater percentage of the total bearing surface of the first radial bearing assembly 200, as compared with other equal angular portions (e.g., circumferential length or angular extent) of the first radial bearing assembly 200. Similarly, the second radial bearing assembly 300 may include a reinforced portion 320, which may have a greater percentage of the total bearing surface of the second radial bearing assembly 300, as compared with other similar sized portions of the second radial bearing assembly 300.

In an embodiment, the first radial bearing assembly 200 may be a stator and the reinforced portion 220 may be stationary relative to a machine or machine component that includes the radial bearing apparatus 100. In additional or alternative examples, the second radial bearing assembly 300 may be a stator, and the reinforced portion 320 may be stationary relative to the machine or its component that includes the radial bearing apparatus 100. Moreover, examples may include the first radial bearing assembly 200 and second radial bearing assembly 300 that may alternate as stator and rotor (i.e., during some periods of operation the first radial bearing assembly 200 may be a stator, while during other periods of operation the second radial bearing assembly 300 may be a stator). In any event, at least the stator of the radial bearing apparatus 100 (i.e., of the first radial bearing assembly 200, the second radial bearing assembly 300, or both) can include one or more reinforced areas, such as the reinforced portion 220 and reinforced portion 320.

In some embodiments, the radial bearing apparatus 100 may be subjected to an unbalanced or preferential loading. For example, an unbalanced (e.g., eccentrically positioned shaft) shaft may cause an unbalanced loading condition. In other words, for example, during a first period of operation a first portion of the first radial bearing assembly 200 may experience a greater load than other portions of the first radial bearing assembly 200. Optionally, during a second period of operation, a second portion of the first radial bearing assembly 200 may experience a greater load than other portions of the first radial bearing assembly 200.

It should be appreciated that the second radial bearing assembly 300 may experience loading similar to the first radial bearing assembly 200. Moreover, such loading may be cyclical or directionally dependent, in a manner that produces increased load on one or more portions of the first radial bearing assembly 200 and/or second radial bearing assembly 300. Uneven loading of one or more portions of the first radial bearing assembly 200 or second radial bearing assembly 300 may lead to premature failure of the radial bearing apparatus 100. Thus, providing reinforced portions to carry the additional load may increase the useful life of the radial bearing apparatus 100.

Figure 2A:
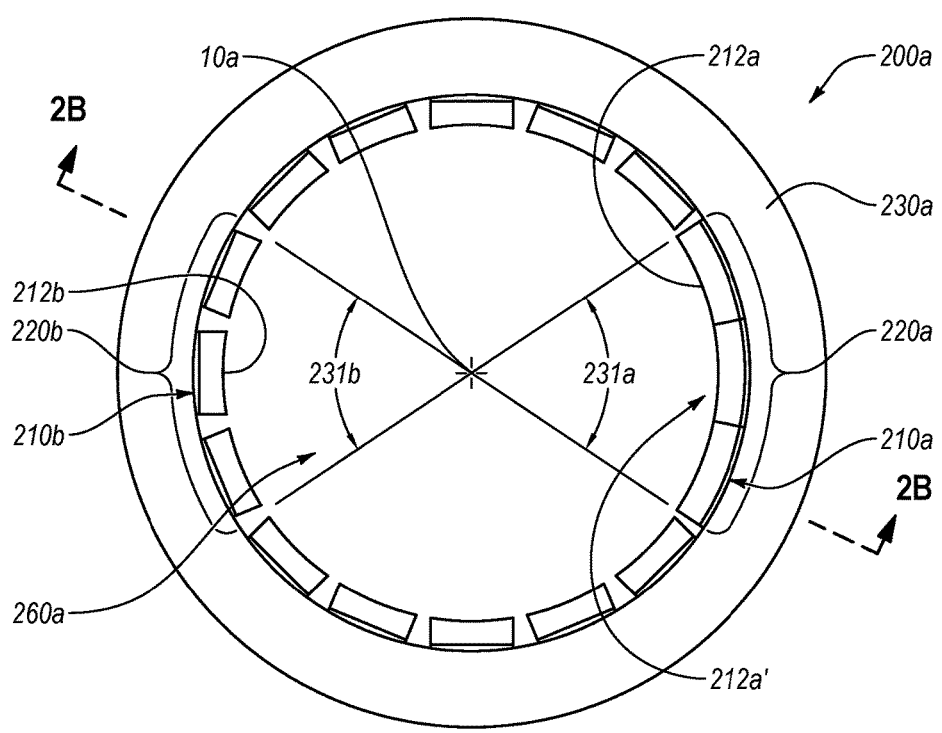
FIG. 2A is a top view of a radial bearing assembly according to an embodiment.
Figure 2B:
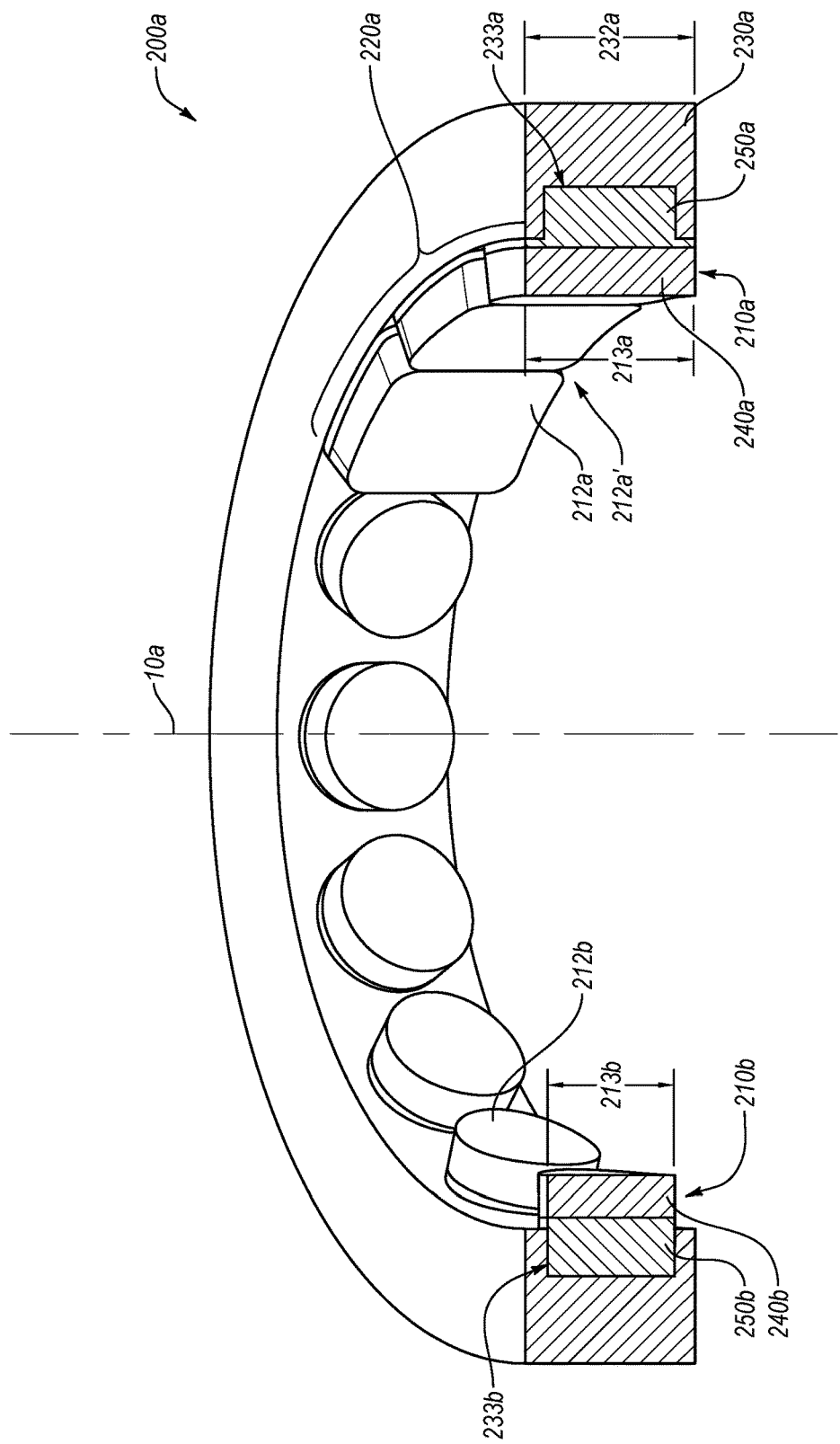
FIG. 2B is a cross-sectional view of the radial bearing assembly of FIG. 2A taken along line 2B-2B.

As noted above, the reinforced portion 220 and/or the reinforced portion 320 may have a greater percentage of the total bearing surface, as compared with the other portions of similar or the same size. FIGS. 2A and 2B illustrate an embodiment of a first radial bearing assembly 200a that includes a reinforced portion 220a. Except as otherwise described herein, the first radial bearing assembly 200a and its materials, elements, or components may be similar to or the same as the first radial bearing assembly 200 (FIG. 1) and its respective materials, elements, and components. For example, as shown in FIG. 2A, the reinforced portion 220a may be similar to or the same as the reinforced portion 220 (FIG. 1).

In some embodiments, the reinforced portion 220a may include superhard bearing elements 210a and 210b secured to a support ring 230a defining an opening 260a. In an embodiment, the superhard bearing elements 210a and 210b may be positioned about a center axis 10a. Generally, the superhard bearing elements 210a, 210b may have any number of suitable arrangements on the support ring 230a, which may vary from one embodiment to another. For instance, the superhard bearing elements 210a, 210b may be circumferentially positioned about the axis 10a. Moreover, in an embodiment, the superhard bearing elements 210a, 210b may be arranged in a single row about the support ring 230a. In additional or alternative embodiments, the superhard bearing elements 210a, 210b may be distributed in two rows, three rows, four rows, or any other number of rows.

In an embodiment, the superhard bearing elements 210a, 210b may define an opening 202a, which may accommodate a second radial bearing assembly that may include bearing elements that may engage the superhard bearing elements 210a, 210b. In particular, the bearing elements of the second radial bearing assembly may engage the superhard bearing elements 210a, 210b in a manner that permits relative rotation of the first radial bearing assembly 200a and the second radial bearing assembly (e.g., about the axis 10a), but limits relative lateral movement thereof. For instance, the first radial bearing assembly 200a and the second radial bearing assembly may rotate relative to each other in a manner that respective center axes thereof remain approximately aligned with each other.

In some embodiments, the superhard bearing elements 210a may be in contact with each other and/or may be located adjacent to one another. For example, the superhard bearing elements 210a may form or define a substantially continuous bearing surface, such as a bearing surface 212a'. Particularly, each of the superhard bearing elements 210a may have a bearing surface 212a, which collectively may form the bearing surface 212a' that may at least partially define the reinforced portion 220a. The superhard bearing elements 210b may have bearing surfaces 212b. The bearing surfaces 212a and the bearing surfaces 212b may collectively form or define the total bearing surface of the first radial bearing assembly 200a.

In alternative or additional embodiments, the bearing surface 212a' may be non-continuous or interrupted. For instance, at least some of the superhard bearing elements 210a that form the bearing surface 212a' may be spaced apart from one another, thereby creating interruptions or gaps in the bearing surface 212a'. Furthermore, the bearing surface 212a' may be formed or defined by a single bearing element, which may include a single or multiple superhard tables (as described below in further detail) that may form or define the bearing surface 212a'.

Alternatively, the reinforced portion 220a may include a single superhard bearing element that may form the entire bearing surface 212a'. In other words, a single superhard bearing element may have a percentage of the total bearing surface that may be greater than the percentage of the total bearing surface at other (e.g., non-reinforced) equal angular portions of the first radial bearing assembly 200a. In any event, whether including a single or multiple bearing elements, the reinforced portion 220a may have a sufficient or suitable percentage or portion of the total bearing surface, to carry the additional load at the reinforced portion 220a.

In some embodiments, the percentage of the total bearing surface formed by the bearing surface 212a' may be in one or more of the following ranges: between about 7% and 10%; between about 9% and 15%; or between about 14% and 20%. Embodiments also may include the bearing surface 212a' that forms or defines more than 20% or less than 7% of the total bearing surface. Accordingly, the reinforced portion 220a may carry a proportionally higher load than other portions of the same or similar angular size of the first radial bearing assembly 200a.

As such, in one or more embodiments, the reinforced portion 220a may have a bearing surface density defined by the total area of the bearing surfaces 212a' in the reinforced portion 220a divided by the span angle 231a. The bearing surface density of the reinforced portion may be higher than the bearing surface density of the non-reinforced portion. For example, the span angle 231a may be in one or more of the following ranges: between about 10 degrees and 20 degrees; between about 15 degrees and 30 degrees; between about 25 degrees and 45 degrees; between about 35 degrees and 90 degrees; between about 80 degrees and 150 degrees; or between about 100 degrees and 180 degrees. In some embodiments, the span angle 231a may be less than 10 degrees or greater than 180 degrees. In other words, some embodiments may include the span angle 231a that may constitute between about 3% and 50% of the circumference of the first radial bearing assembly 200a.

Similarly, in some embodiments, the reinforced portion 220a may carry higher maximum load per degree, along the span angle 231a. For instance, the reinforced portion 220a may carry a maximum percent (of total) load per degree that may be in one or more of the following ranges: between about 0.3% per degree to about 1% per degree; between about 0.5% per degree to about 2.5% per degree; between about 2% per degree to about 5% per degree; or between about 4% per degree to about 9% per degree.

In addition, embodiments may include bearing surfaces 212a that have a larger surface area than the bearing surfaces 212b. In other words, any of the bearing surfaces 212a may include a larger surface area than any of the bearing surfaces 212b. For example, surface area of any of the bearing surfaces 212a may be greater than the surface area of any of the bearing surfaces 212b by a percentage that is in one or more of the following ranges: between about 5% and 10%; between about 8% and 20%; between about 15% and 45%; or between about 35% and 70%. In some embodiments, the surface area of any of the bearing surfaces 212a may be greater than the surface area of any of the bearing surfaces 212b by a percentage that is less than 5% or greater than 70%.

The bearing surfaces 212b may form or define one or more unreinforced portions. For example, an unreinforced portion 220b may have a span angle 231b, which may be the same as the span angle 231a of the reinforced portion 220a. In some embodiments, the unreinforced portion 220b may have a lower bearing surface density (i.e., total surface area of the bearing surface 212b enclosed in the span angle 231b divided by the span angle 231b) than the bearing surface density of the reinforced portion 220a.

In addition, the reinforced portion 220a may exhibit greater or higher thermal stability that the unreinforced portion, as described in greater detail in U.S. Pat. No. 8,496,075, which is incorporated herein, in its entirety, by this reference. For example, the superhard bearing elements 210a that comprise the reinforced portion 220a may include a greater amount of exposed surface area than the superhard bearing elements 210b, which comprise the unreinforced portion. As such, the superhard bearing elements 210a may have dissipate more heat (e.g., to a fluid that may flow about the superhard bearing elements) than the superhard bearing elements 210b. It should be appreciated that increased heat dissipation may allow the superhard bearing elements 210a to carry a greater load than the superhard bearing elements 210b without overheating, which may otherwise lead to degradation and/or failure thereof.

For instance, the superhard bearing elements 210a may have a thicker superhard table than the superhard bearing elements 210b. A thicker superhard table (e.g., polycrystalline diamond table) may increase the strength of the superhard bearing elements 210a, as compared with the superhard bearing elements 210b. Moreover, the thicker superhard table may provide more highly conductive surface area for the superhard bearing elements 210a (as compared with the superhard bearing elements 210b). In other words, with the thicker superhard table, such as a polycrystalline diamond table, the superhard bearing elements 210a may exhibit greater overall heat transfer and may provide increased heat dissipation from the first bearing assembly 200a (as compared the superhard bearing elements 210b, which may include a thinner superhard table), as described in further detail in U.S. patent application Ser. No. 13/899,785, which is incorporated herein, in its entirety, by this reference. In addition, one, some, or all of the superhard bearing elements 210b may be substrateless and may include only superhard tables. For instance, the superhard table may be fully leached (e.g., in a manner that removes the original substrate from the superhard bearing table). In some embodiments, the superhard tables may be bonded directly to the support ring 230a. Alternatively or additionally, one or more of the superhard tables may be secured to the support ring 230a with one or more retention rings, as described in further detail in U.S. Pat. No. 8,496,075.

Although, as noted above, the bearing surface 212a' may comprise between about 7% and 20% of the total bearing surface, the reinforced portion 220a may constitute or span over any suitable portion of the total perimeter or circumference of the first radial bearing assembly 200a. In some embodiments, the reinforced portion 220a may span or extend along the perimeter or circumference of the first radial bearing assembly 200a to a span angle 231a that may be in one or more of the following ranges: between about 4° and 18°; between about 14° and 30°; between about 25° and 60°; between about 40° and 72°; between 60° and 90°; between 80° and 120°; between 100° and 150°; or between 140° and 180°. Embodiments also may include the reinforced portion 220a that has the span angle 231a that is less than 4° or greater than 72°.

Embodiments also may include superhard bearing elements 210b that have bearing surfaces 212b. More specifically, the bearing surfaces 212b collectively may form the remainder of the total bearing surface (i.e., the portion of the total bearing surface other than the portion formed by the bearing surface 212a'). In some embodiments, the superhard bearing elements 210b and correspondingly the bearing surfaces 212b may be smaller than the superhard bearing elements 210a and the bearing surfaces 212a, respectively. Alternatively, the superhard bearing elements 210b and the bearing surfaces 212b may have the same or similar size to the respective superhard bearing elements 210a and the bearing surfaces 212a. Also, in some instances, the superhard bearing elements 210b and the bearing surfaces 212b may be larger than the individual superhard bearing elements 210a and the corresponding bearing surfaces 212a. The span angle 231a of the bearing surface 212a' may vary from one embodiment to another. In any case, however, the bearing surface 212a' located at the reinforced portion 220a may form a greater percentage of the total bearing surface than the portions of the total bearing surface formed by the bearing surfaces 212b, which have the same span angle (e.g., span angle 233a) as the span angle 231a of the reinforced portion 220a.

In some embodiments, the bearing surfaces 212a may have a height 213a that is approximately equal to a height 232a of the support ring 230a, as illustrated in FIG. 2B. In additional or alternative embodiments, the bearing surfaces 212b may have a height 213b that is less than the height 232a of the support ring 230a. As such, for example, the reinforced portion 220a with the bearing surface 212a' that comprise 10% of the total bearing surface, may have the span angle 231a (FIG. 2A) of less than 10% of the total angle (i.e., less than 36°).

In alternative or additional embodiments, the bearing surface 212a' may have more surface area than other portions (e.g., the portion included by span angle 231b) that have span angles equal to the span angle 231a (FIG. 2A; span angle 231a is equal to the span angle 231b). For instance, the bearing surface 212a' may be greater than the bearing surface area on another portion of the support ring 230a (e.g., the position included by the span angle 231b) by a percentage in one or more of the following ranges: between about 5% and about 10%; between about 8% and 20%; between about 15% and 30%; or between about 25% and 50%. In some embodiments, the bearing surface 212a' may be greater than the bearing surfaces of unreinforced portions by s less than 5% or greater than 50%. In any event, the reinforced portion 220a may have the bearing surface 212a' that is sufficiently larger than bearings surfaces of comparable unreinforced portions of the first radial bearing assembly 200a, such as to carry the additional or preferential load experienced thereby.

In some instances, the reinforced portion 220a may carry a maximum load (i.e., the maximum load on the reinforced portion 220a may be greater than the maximum load on other portions that have the same angular span as reinforced portion 220a) that exceed the maximum load that can be carried by another portion with the same angular span. For example, the percentage by which the reinforced portion 220a may carry a greater maximum load than unreinforced portions may be calculated as (maximum load of reinforced portion 220a−maximum load of unreinforced portion)÷ (maximum load of unreinforced portion), and may be in one or more of the following ranges: between about 5% and about 10%; between about 8% and 20%; between about 15% and 30%; between about 25% and 50%; between about 35% and 70%; or between about 55% and 100%. In some instances, the additional load may be less than 5% or greater than 100% (e.g., at least about 200%, at least about 300%, at least about 400%, at least about 500%, at least about 600%, at least about 700%, or at least about 800%).

Moreover, in some embodiments, the percentage of additional load carried by the reinforced portion 220a may be greater than the percentage by which the area of the bearing surface 212a' is larger than the area of the bearings surfaces of comparable unreinforced portions, which have angles span equal to the reinforced portion 220a. In other words, for example, the reinforced portion 220a may carry 20% more load than a comparable unreinforced portion, while the bearing surface 212a' may be 10% larger than the bearing surface of the unreinforced portion. Particularly, as noted above, the bearing surface 212a' may be substantially uniform or uninterrupted over the span angle 231a (FIG. 2A). Consequently, in some embodiments, the bearing surface 212a' may operate in hydrodynamic mode (i.e., a film may be formed between the bearing surface 212a' and the opposing bearing surface(s) of the second radial bearing assembly). The hydrodynamic operation may allow the reinforced portion 220a to carry additional load that is, as measured on a percentage basis, disproportionately larger than the additional surface area, as measured on a percentage basis, of the bearing surface 212a', as compared with the unreinforced portion(s) of equal angular span. For example, the reinforced portion 220a may have a greater percentage than a surface area of an unreinforced portion and may carry a greater percentage of the maximum load than an unreinforced portion can carry. Similarly, the reinforced portion 220a may carry a percentage of the maximum load that an unreinforced portion can carry (e.g., total maximum load) that is greater than the percentage of the total angle formed by the span angle 231a.

In some embodiments, the superhard bearing elements 210a and 210b may have respective superhard tables 240a, 240b and substrates 250a, 250b. The superhard bearing elements 210a, 210b may be secured to and/or integrated with a support ring 230a. In some embodiments, a portion of one, some or all of the substrates 250a and/or 250b may protrude out of the support ring 230a. Alternatively, one, some, or all of the substrates 250a and/or 250b may be located completely inside the support ring 230a, such that only the respective superhard tables 240a and 240b protrude out of the support ring 230a.

The superhard bearing elements 210a, superhard bearing elements 210b may be secured to the support ring 230a in any number of suitable ways that may vary from one embodiment to the next. For instance, the superhard bearing elements 210a, 210b may be at least partially secured within respective recesses 233a, 233b in the support ring 230a by brazing, press-fitting, threadedly attaching, fastening with a fastener, combinations of the foregoing, or another suitable technique. The recesses 233a, 233b may be located in and/or defined by the support ring 230a.

At least one, some of, or each of the superhard bearing elements 210a, 210b may include a superhard table that has a concave bearing surface (e.g., curved to form an interior surface of an imaginary cylinder), such as the bearing surfaces 212a, 212b. Similarly, at least one, some of, or each of superhard bearing elements of the second radial bearing assembly (described below) may include a superhard table that has a convex bearing surface (e.g., curved to form at least a portion of an exterior surface of an imaginary cylinder or sphere) that may correspond with the curvature of the bearing surfaces 212a, 212b. In any event, the concave bearing surfaces 212a, 212b and the convex bearing surfaces may be shaped, sized, positioned, and oriented to generally correspond with and engage one another during operation of the radial bearing apparatus.

In one or more embodiments, the superhard bearing elements 210a, 210b may be pre-machined to selected tolerances and mounted on and/or within the support ring 230a. Optionally, the superhard bearing elements 210a, 210b may be first mounted on and/or in the support ring 230a and then shaped (e.g., by grinding and/or lapping) to form bearing surfaces 212a, 212b thereof, so that the bearing surfaces 212a, 212b are shaped to engage the bearing surfaces of the opposing bearing elements of the second radial bearing assembly. Optionally, one or more of the superhard bearing elements 210a, 210b may have a peripherally extending edge chamfer.

Also, the support ring 230a may define an outer perimeter (e.g., an outer diameter) of the first radial bearing assembly 200a. Furthermore, the support ring 230a may include support surfaces or areas that may couple or may be secured to a stationary portion of a device or mechanism. For instance, the support ring 230a of the first radial bearing assembly 200a may be fixedly secured to a housing of the subterranean drilling system. Accordingly, a radial bearing apparatus that includes the first radial bearing assembly 200a may facilitate rotation of an output shaft relative to a housing about the rotation axis 10a.

As mentioned above, the superhard bearing elements 210a, 210b may include the respective superhard tables 240a, 240b bonded to corresponding substrates 250a, 250b. For example, the superhard tables 240a, 240b may comprise polycrystalline diamond and the substrate substrates 250a, 250b may comprise cobalt-cemented tungsten carbide. Other carbide materials may be used with tungsten carbide or as an alternative, such as chromium carbide, tantalum carbide, vanadium carbide, titanium carbide, or combinations thereof cemented with iron, nickel, cobalt, or alloys thereof. Furthermore, in any of the embodiments disclosed herein, the polycrystalline diamond table may be leached to at least partially remove or substantially completely remove a metal-solvent catalyst (e.g., cobalt, iron, nickel, or alloys thereof) that was used to initially sinter precursor diamond particles to form the polycrystalline diamond. In another embodiment, an infiltrant used to re-infiltrate a preformed leached polycrystalline diamond table may be leached or otherwise removed to a selected depth from a bearing surface. Moreover, in any of the embodiments disclosed herein, the polycrystalline diamond may be un-leached and include a metal-solvent catalyst (e.g., cobalt, iron, nickel, or alloys thereof) that was used to initially sinter the precursor diamond particles that form the polycrystalline diamond and/or an infiltrant used to re-infiltrate a preformed leached polycrystalline diamond table. Examples of methods for fabricating the superhard bearing elements and superhard materials and/or structures from which the superhard bearing elements may be made are disclosed in U.S. Pat. Nos. 7,866,418; 7,998,573; 8,034,136; and 8,236,074; the disclosure of each of the foregoing patents is incorporated herein, in its entirety, by this reference.

The diamond particles that may be used to fabricate the superhard table 150a in a high-pressure/high-temperature process ("HPHT") may exhibit a larger size and at least one relatively smaller size. As used herein, the phrases "relatively larger" and "relatively smaller" refer to particle sizes (by any suitable method) that differ by at least a factor of two (e.g., 30 µm and 15 µm). According to various embodiments, the diamond particles may include a portion exhibiting a relatively larger size (e.g., 70 µm, 60 µm, 50 µm, 40 µm, 30 µm, 20 µm, 15 µm, 12 µm, 10 µm, 8 µm) and another portion exhibiting at least one relatively smaller size (e.g., 15 µm, 12 µm, 10 µm, 8 µm, 6 µm, 5 µm, 4 µm, 3 µm, 2 µm, 1 µm, 0.5 µm, less than 0.5 µm, 0.1 µm, less than 0.1 µm). In an embodiment, the diamond particles may include a portion exhibiting a relatively larger size between about 10 µm and about 40 µm and another portion exhibiting a relatively smaller size between about 1 µm and 4 µm. In another embodiment, the diamond particles may include a portion exhibiting the relatively larger size between about 15 µm and about 50 µm and another portion exhibiting the relatively smaller size between about 5 µm and about 15 µm. In another embodiment, the relatively larger size diamond particles may have a ratio to the relatively smaller size diamond particles of at least 1.5. In some embodiments, the diamond particles may comprise three or more different sizes (e.g., one relatively larger size and two or more relatively smaller sizes), without limitation. The resulting polycrystalline diamond formed from HPHT sintering the aforementioned diamond particles may also exhibit the same or similar diamond grain size distributions and/or sizes as the aforementioned diamond particle distributions and particle sizes. Additionally, in any of the embodiments disclosed herein, the superhard bearing elements may be freestanding (e.g., substrateless) and optionally may be at least partially or fully leached to remove a metal-solvent catalyst initially used to sinter the polycrystalline diamond body.

It should be appreciated that, generally, the superhard bearing elements and/or their corresponding bearing surfaces may have any suitable shape, which may vary from one embodiment to the next. FIG. 2C illustrates one embodiment of a first radial bearing assembly 200c that includes superhard bearing elements 210c and 210d. Except as otherwise described herein, the first radial bearing assembly 200e and its respective materials, elements, or components may be similar to or the same as one another as well as any of the radial bearing assemblies 200, 200a, 300 (FIGS. 1-2B) and their respective materials, elements, and components. In one example, the superhard bearing elements 210c may form a reinforced portion 220e. Furthermore, the superhard bearing elements 210c may have complimentary shapes, such that adjacent superhard bearing elements 210c may partially nest with one another, thereby providing greater coverage of a support ring 230c. In particular, bearing surfaces 212c of the superhard bearing elements 210c may provide greater coverage of the support ring 230 at the reinforced portion than at unreinforced portion(s) of the first radial bearing assembly 200c. For example, the superhard bearing element 210c may have a diameter that is larger than the diameter of the superhard bearing element 210d.

In some embodiments, the superhard bearing elements 210d may form one or more unreinforced portions, which may have lower bearing surface density than the reinforced portion 220c. Moreover, in some instances, the superhard bearing elements 210d may have complimentary shapes, such that one superhard bearing element 210d fits about an adjacent superhard bearing element 210d. As such, bearing surface 212d of one superhard bearing element 210d also may fit about bearing surface 212d of the adjacent superhard bearing element 210d. It should be also appreciated that, generally, the superhard bearing elements that form reinforced and unreinforced portions may have any suitable shape, which, in some instances, may be complimentary to adjacent superhard bearing elements.

As described above, the reinforced portion of the radial bearing assembly may include a single or multiple superhard bearing elements. FIGS. 3A and 3B illustrate embodiments of superhard bearing elements 210c, 210e, either of which may form or define one or more reinforced portions of a radial bearing assembly. Except as otherwise described herein, the reinforced portions 220c, 220e and their respective materials, elements, or components may be similar to or the same as one another as well as any of the reinforced portion 220, 220a (FIGS. 1-2B) and their respective materials, elements, and components. It should be also appreciated that the reinforced portion 220c and the reinforced portion 220e, as illustrated, may have bearing surfaces that are substantially uninterrupted and of the same size as one another.

FIG. 3A illustrates an embodiment of a reinforced portion 220c that includes superhard bearing elements 210c, 210c', 210c", which have respective superhard tables 240c, 240c' 240c" bonded to corresponding substrates 250c, 250c', 250c". Similar to the superhard bearing elements 210a (FIGS. 2A and 2B), each of the superhard bearing elements 210c, 210c', 210c" may have a corresponding bearing surfaces 212c, 212c', 212c", which may collectively form a bearing surface 212d' that may be similar to or the same as the bearing surface 212a' (FIGS. 2A and 2B). In addition, embodiments may include the superhard bearing elements 210c, 210c', 210c" that have approximately rectangular or cylindrical shape. In other words, the superhard bearing elements 210c, 210c', 210c" may have approximately cylindrical or rectangular prismoid peripheral surface (e.g., such that any portion of the peripheral surface is parallel to any other portion thereof).

As such, in some instances, the superhard bearing elements 210c, 210c', 210c" may have a different overall length one from another, which may vary from one embodiment to the next. For example, the superhard bearing elements 210c' may be approximately the same as the superhard bearing elements 210c", while the superhard bearing elements 210c may be shorter than and positioned between the superhard bearing elements 210c' and 210c". In any event, however, the superhard bearing elements 210c, 210c', 210c" may assembly together in a manner that forms an uninterrupted bearing surface 212d'.

In an embodiment, the reinforced portion 220c may include a radius or a chamfer about a perimeter thereof, such as a radius 270c. For instance, the outermost superhard bearing elements (e.g., superhard bearing elements 210c, 210c") may have a chamfer, radius, an otherwise blunt edge, and combinations thereof, such as the radii 270c. In an embodiment, the blunt edges or the radii 270c may be formed about the outer perimeter of the reinforced portion 220c, such that the bearing surface 212d' may be at least substantially uninterrupted. As such, the superhard bearing elements 210c, 210c', 210c" may have sharp corners or edges between the respective peripheral surfaces and the superhard bearing surfaces thereof at interface or contact locations with one another. In other words, when positioned next to each other, the superhard bearing elements 210c, 210c', 210c" may form an uninterrupted bearing surface 212d', without interruptions therein from radii, chamfers, and the like.

Furthermore, in some embodiments, any of the superhard bearing elements 210c, 210c', 210c" may have arcuate interface 280c between the corresponding substrates 250c, 250c', 250" and the superhard tables 240c, 240c', 240c". For instance, the arcuate interface 280c may approximately follow the curvature of the bearing surface 212d', such that the superhard tables 240c, 240c', 240c" may have an approximately uniform thickness. In alternative or additional embodiments, the curvature of any of the interfaces between the corresponding substrates 250c, 250c', 250" and the superhard tables 240c, 240c', 240c" may be different from the curvature of the bearing surface 212d' (e.g., such that the thickness of one or more of the substrates 250c, 250c', 250" varies).

In some embodiments, as illustrated in FIG. 3B, the superhard bearing elements that comprise the reinforced portion may have approximately the same size as one another. In particular, the reinforced portion 220e may include superhard bearing elements 210e, which may have at least two opposing tapered sides. As such, adjacent ones of the superhard bearing elements 210e may be positioned in contact or near each other to form a bearing surface 212g'. More specifically, each of the superhard bearing elements 210e may have a bearing surface 212e, which collectively may form the bearing surface 212g' that may be substantially uninterrupted.

Additionally, the superhard bearing elements 210e may include an interface 280e between the superhard tables 240e and the substrates 250e. Specifically, in some instances, the interface 280e may be approximately planar. Accordingly, the superhard tables 240e may have a variable or non-uniform thickness along the interface 280e. For instance, the superhard tables 240e may have a thickest portion thereof near adjacent superhard tables. As such, the adjacent superhard tables 240e may provide more reinforcement at the respective edges thereof, which may be otherwise prone to cracking, fracturing, or other failure more easily than interior portions of the superhard table 240e. In any case, adjacent bearing surfaces 212e may be placed next to one another to form the bearing surface 212g' that may have a suitable strength and configuration.

In addition, bearing elements may be positioned closer to one another at the reinforced portion(s) of the bearing assembly than at the unreinforced portions. For example, FIG. 3C illustrates a reinforced portion 220h, which may include multiple superhard bearing elements 210h, each of which may have a bearing surface 212h. Collectively, the bearing surfaces 212h may form or define a bearing surface 212h' of the bearing assembly. Except as otherwise described herein, the materials, elements, or components of the reinforced portion 220h may be similar to or the same as materials, elements, or components of reinforced portions 220c, 220e (FIGS. 3A, 3B).

In one example, the superhard bearing elements 210h may be spaced apart by a distance $S_R$, which may be greater than zero. Particularly, the distance $S_R$ may vary from one embodiment to the next. For instance, the distance $S_R$ may be in one or more of the following ranges: between about 0.01 inches and about 0.10 inches; between about 0.05 inches and 0.20 inches; or between 0.15 inches and 0.30 inches. In some embodiments, the distance $S_R$ may be greater than 0.30 inches or less than 0.15 inches.

As mentioned above, distance between the bearing elements at the unreinforced portion(s) may be greater than at reinforced portions. FIG. 3D illustrates one embodiment that includes superhard bearing elements 210k that form an unreinforced portion 220k. Except as otherwise described herein, the materials, elements, or components of the unreinforced portion 220k may be similar to or the same as materials, elements, or components of reinforced portions 220c, 220e, 220h (FIGS. 3A, 3B, 3C). For instance, the superhard bearing elements 210k may be spaced apart from each other by a distance $S_U$, which may be greater than the distance $S_R$ (FIG. 3C), Examples may include the distance $S_u$ in one or more of the following ranges: between about 0.1. inches and about 0.20 inches; between about 0.15 inches and 0.30 inches; or between 0.25 inches and 0.40 inches. In some embodiments, the distance $S_R$ may be greater than 0.40 inches or less than 0.10 inches.

Figure 4A:
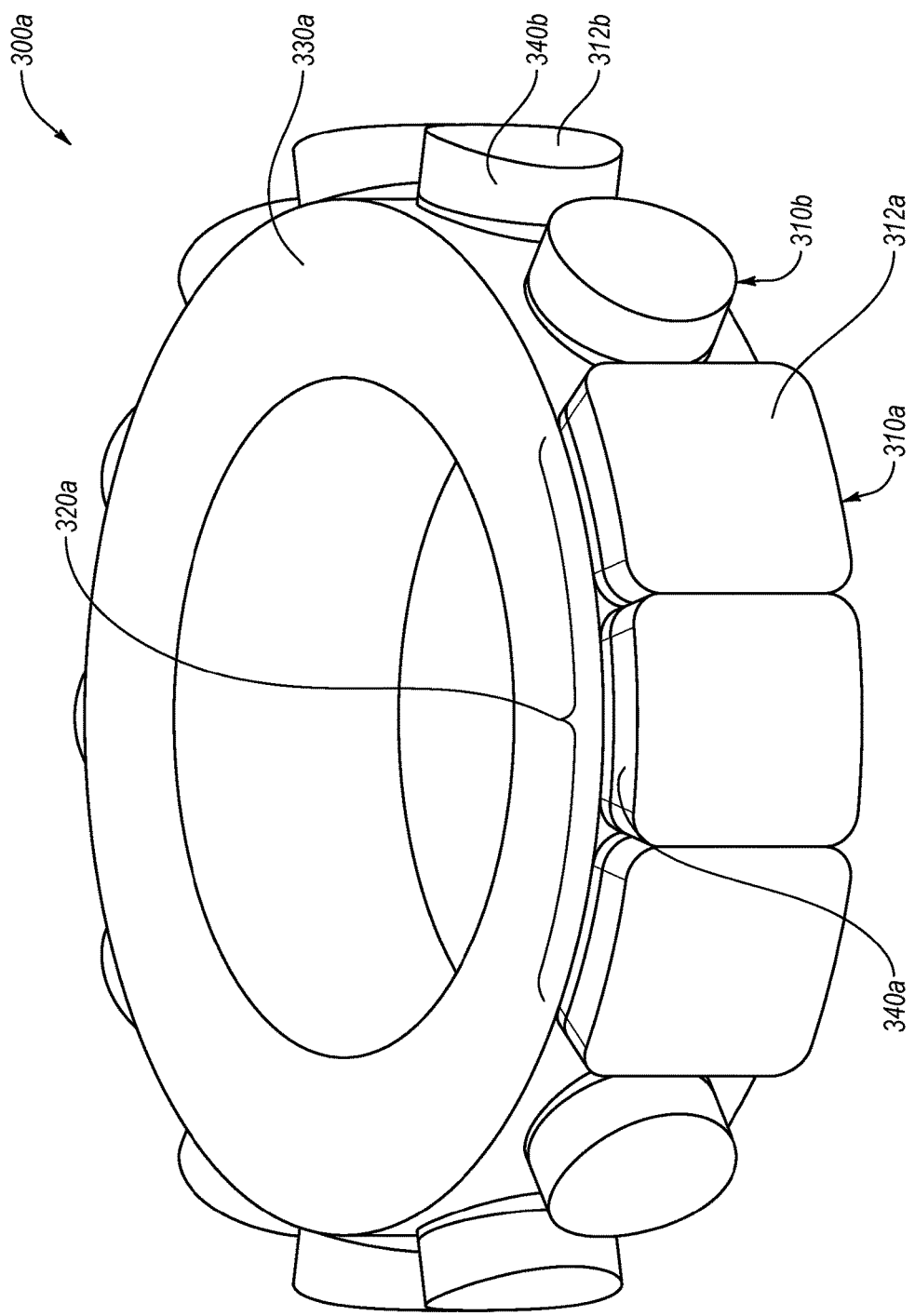
FIG. 4A is an isometric view of a radial bearing assembly according to another embodiment.

As mentioned above, the radial bearing apparatus may include the first and the second radial bearing assemblies. An embodiment of a second radial bearing assembly 300a is illustrated in FIG. 4A. Except as otherwise described herein the second radial bearing assembly 300a and its materials, elements, or components may be similar to or the same as the second radial bearing assembly 300 (FIG. 1) as well as the first radial bearing assemblies 200, 200a (FIGS. 1-2B) and their respective materials, elements, and components. For instance, the second radial bearing assembly 300a may include superhard bearing elements 310a, 310b secured to or within a support ring 330a. In addition, the second radial bearing assembly 300a may include a reinforced portion 320a, which may be comprised of superhard bearing elements 310a, 310b. It should also be appreciated that the superhard bearing elements 310a, 310b may be similar to any of the superhard bearing elements 210, 210a, 210b, 210c, 210c', 210c", 210e (FIG. 1-3B).

In an embodiment, the superhard bearing elements 310a, 310b may be positioned and oriented on the support ring 330a in a manner that the superhard bearing elements 310a, 310b may engage corresponding bearing elements of any of the first radial bearing assemblies (FIGS. 1-2B) described above. In other words, the superhard bearing elements 310a, 310b may include superhard tables 340a, 340b having suitable thicknesses and convex bearing surfaces 312a, 312b, which may correspond to concave bearing surface(s) of the first radial bearing assembly. In an embodiment, all of the bearing elements of the second radial bearing assembly 300a may include a substrate (e.g., similar to the substrates 250a, 250b). Furthermore, in an embodiment, the second radial bearing assembly 300a may include superhard bearing elements 310a, 310b that are positioned near or in contact with each other, and which may form a bearing surface that is substantially larger than bearing surfaces of other bearing elements of the second radial bearing assembly. Such configurations may accommodate loads that may be unevenly distributed about the second radial bearing assembly 300a.

Similar to the first radial bearing assemblies described above, the second radial bearing assembly 300a may include superhard bearing elements 310a, 310b arranged in any number of suitable configurations, orientations, and positions. For instance, the superhard bearing elements 310a, 310b may be arranged in a single row, in two rows, three rows, four rows, or any other number of rows. In any event, as mentioned above, the superhard bearing elements 310a, 310b may be arranged in a manner that allows the superhard bearing elements 310a, 310b to contact and/or slide against the bearing elements of the first radial bearing assembly.

Figure 4B:
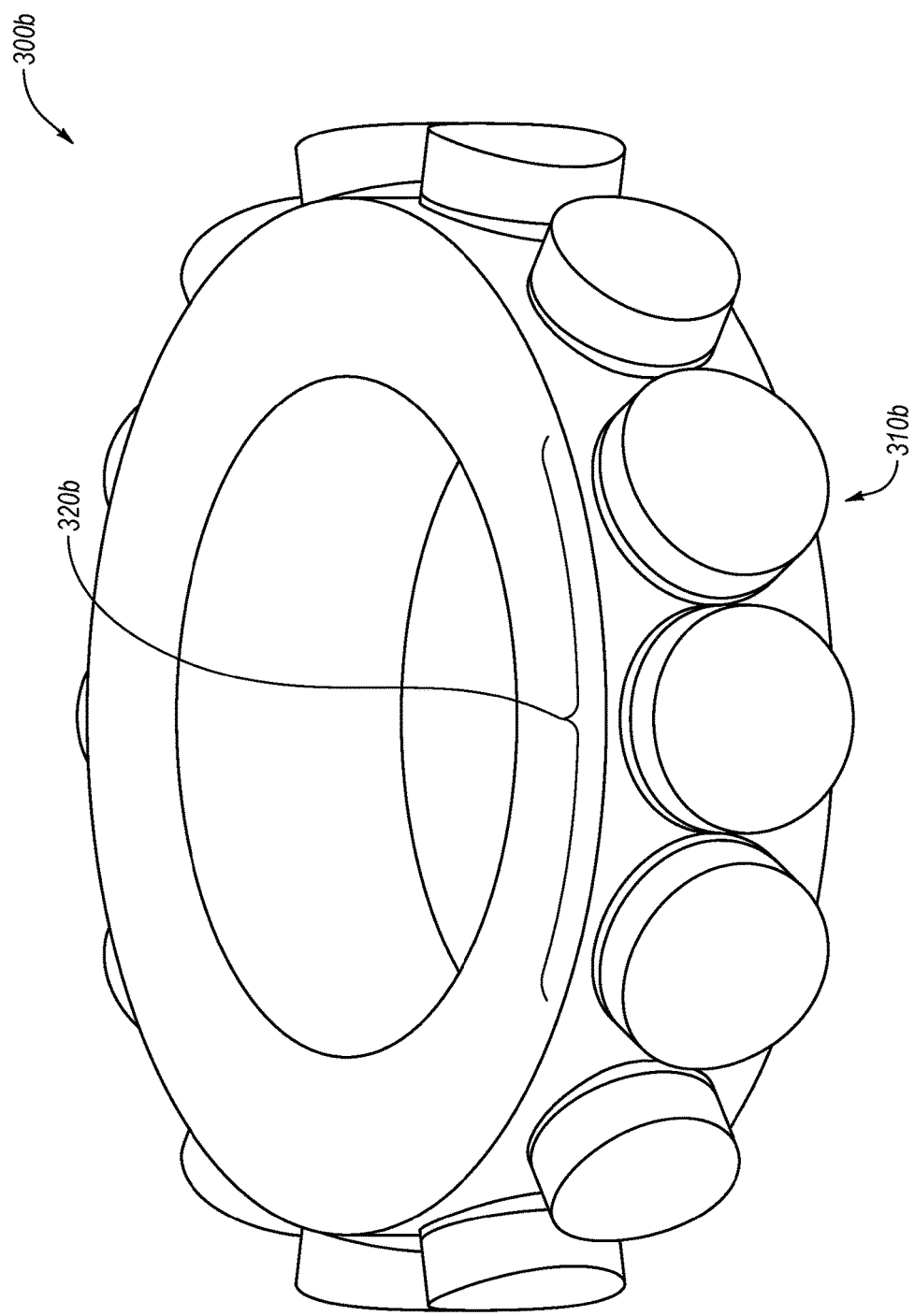
FIG. 4B is an isometric view of a radial bearing assembly according to yet another embodiment.

Although the second radial bearing assembly 300a includes rectangular or square bearing elements 310a at the reinforced portion 320a, it should be appreciated that this embodiment is not so limited. For example, FIG. 4B illustrates a second radial bearing assembly 300b may include non-rectangular or approximately cylindrical superhard bearing elements 310b, which may form a reinforced portion 320b. Except as otherwise described herein, the materials, elements, or components of the second radial bearing assembly 300b may be similar to or the same as materials, elements, or components of second radial bearing assembly 300a (FIG. 4A). Furthermore, the particular shape and size of the superhard bearing elements that form the reinforced and/or unreinforced portions of the bearing assembly may vary from one embodiment to the next. For instance, among other shapes, the superhard bearing elements may have oval, triangular, and irregular cross-sectional shapes. In any event, however, the reinforced portion 320b may have a higher bearing surface density than the unreinforced portion and may include superhard bearing elements that have greater surface area than one, some, or each of the superhard bearing elements that form the unreinforced portion.

Figure 5:
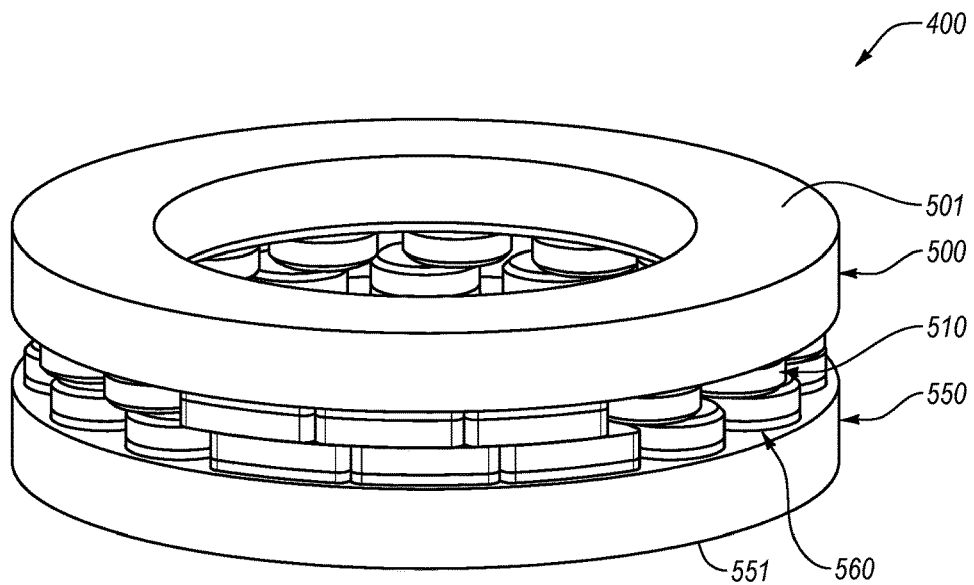
FIG. 5 is an isometric view of a thrust-bearing apparatus according to an embodiment.

Although the above description relates to radial bearing assemblies and apparatuses, it should be appreciated that this invention is not so limited. Embodiments also may include thrust-bearing assemblies and apparatuses. FIG. 5 illustrates an embodiment of a thrust-bearing apparatus 400, which may incorporate first and second thrust-bearing assemblies 500, 550. In some instances, the first thrust-bearing assembly 500 may be a stator, while the second thrust-bearing assembly 550 may be a rotor, or vice versa. Additionally or alternatively, both of the first and second thrust-bearing assemblies 500 and 550 may be rotors. Furthermore, except as otherwise described herein, the first thrust-bearing assembly 500 and the second thrust-bearing assembly 550 and their respective materials, elements, or components may be similar to or the same as one another as well as similar or analogous to any of the first radial bearing assemblies 200, 200a and second radial bearing assemblies 300, 300a (FIGS. 1-4) and their respective materials, elements, and components.

Each of the first thrust-bearing assembly 500 and the second thrust-bearing assembly 550 may include multiple generally opposing superhard bearing elements (e.g., superhard bearing elements 510, 560) that face and engage one another, and which may be mounted in or on respective support rings 501, 551. In any case, the superhard bearing elements 510, 560 may engage each other in a manner that prevents or limits relative axial movement of the first thrust-bearing assembly 500 and the second thrust-bearing assembly 550. Moreover, while the first thrust-bearing assembly 500 and the second thrust-bearing assembly 550 may be restricted or limited from relative axial movement, the first and second thrust-bearing assemblies 500 and 550 may move laterally and/or rotationally relative to each other. Accordingly, connecting or securing the first thrust-bearing assembly 500 and the second thrust-bearing assembly 550 to movable machine components may allow such components to move laterally radially relative to each other, while limiting or preventing axial movement thereof.

Figure 6A:
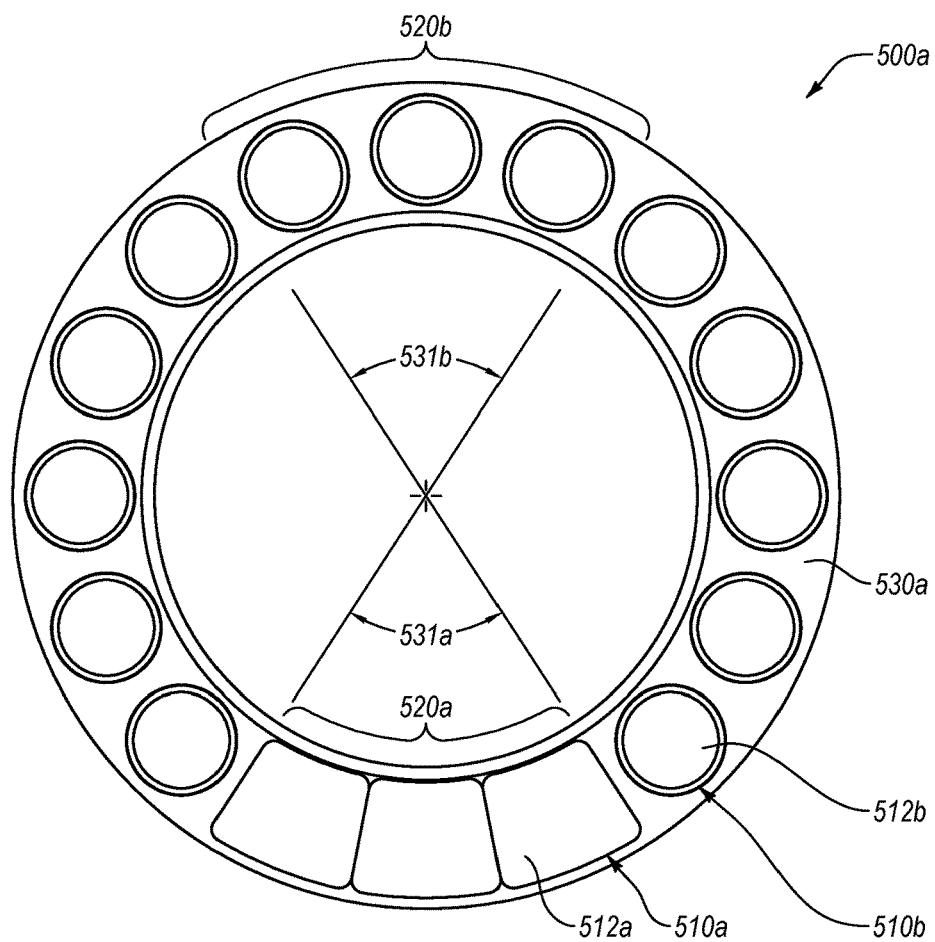
FIG. 6A is a top view of a thrust-bearing assembly according to an embodiment.

The particular configuration of the first and/or second thrust-bearing assemblies 500, 550 may vary from one embodiment to the next. Moreover, in some instances, the thrust-bearing apparatus 400 may include a first thrust-bearing assembly 500 or the second thrust-bearing assembly 550 that engages a bearing surface, which is incorporated into or forms a part of a moving or movable machine component. FIG. 6A illustrates an embodiment of a first thrust-bearing assembly 500a that includes a reinforced portion 520a, which may be preferentially loaded, in a manner that the reinforced portion 520a carries a greater amount of load than similar sized portions of the first thrust-bearing assembly 500a. Except as otherwise described herein, the first thrust-bearing assembly 500a and its materials, elements, or components may be similar to or the same as the first thrust-bearing assembly 500 and/or the thrust-bearing assembly 550 (FIG. 5) and its respective materials, elements, and components. Furthermore, the reinforced portion 520a and its materials, elements, or components may be similar or analogous to any of the reinforced portions 220, 220a, 220c, 220e, 320, 320a (FIGS. 1-4) and their respective materials, elements, or components. Additionally, the second thrust-bearing assembly 500a may be either a stator or a rotor.

In some embodiments, the first thrust-bearing assembly 500a may include superhard bearing elements 510a that may form one or more reinforced portions, such as the reinforced portion 520a, and superhard bearing elements 510b that may form unreinforced portions of the first thrust-bearing assembly 500a. Particularly, the superhard bearing elements 510a may include bearing surfaces 512a, and the superhard bearing elements 510b may include bearing surfaces 512b. The bearing surfaces 512a and 512b may engage corresponding bearing surfaces (or a single bearing surface) of the second thrust-bearing assembly in a manner described above.

Additionally, some or all of the superhard bearing elements 510a may form a substantially uniform or uninterrupted bearing surface, that may be preferentially loaded (i.e., may carry more load than other portions of the first thrust-bearing assembly 500a that span to a similar or the same angle on a support ring 530a). Also, embodiments may include the reinforced portion 520a that has approximately the same size and/or proportions relative to other portions of the first thrust-bearing assembly 500a as described above in connection with the radial bearing assemblies and apparatuses. In any event, the reinforced portion 520a may allow uneven or preferential loading of the first thrust-bearing assembly 500a as well as of the thrust-bearing apparatus incorporating the first thrust-bearing assembly 500a. Moreover, such loading may be continuously or cyclically preferential (i.e., the reinforce portion 520a may continuously or cyclically experience higher loads than other portions).

In one embodiment, the reinforced portion 520a may have a span angle 531a, while an unreinforced portion 520b may have a span angle 531b. Furthermore, bearing surface density of the reinforced portion 520a may be greater than the bearing surface density of the unreinforced portion 520b. Bearing surface density of the reinforced portion 520a is defined as the total bearing surface area of the reinforced portion 520a divided by the span angle 531a. Likewise, a bearing surface density of the unreinforced portion 520b is defined by the total bearing surface area of the unreinforced portion 520b divided by the span angle 531b.

Figure 6B:
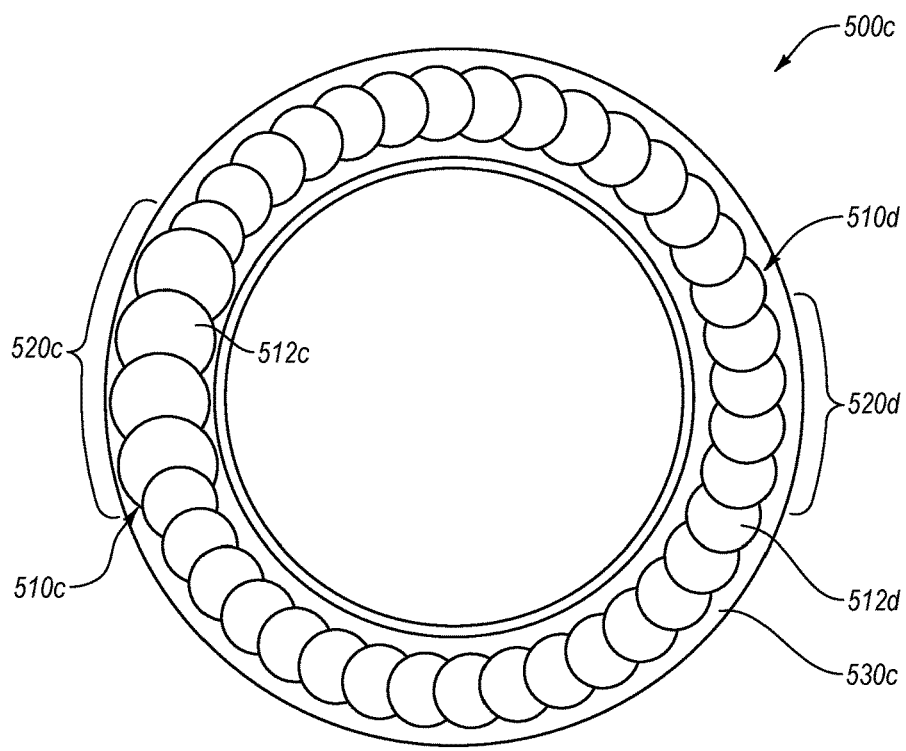
FIG. 6B is a top view of a thrust-bearing assembly according to another embodiment.

In some embodiments, one or more of the superhard bearing elements may have complimentary shapes with one or more of the adjacent superhard bearing elements as described in more detail in U.S. Pat. No. 7,896,551, entitled "Hydrodynamic Bearing Assemblies, And Hydrodynamic Bearing Apparatuses And Motor Assemblies Using Same," filed on Oct. 15, 2007, and in U.S. patent application Ser. No. 13/480,932, entitled "Bearing Apparatuses And Motor Assemblies Using Same," filed on May 25, 2012. For example, FIG. 6B illustrates a first thrust bearing assembly 500c that may include a reinforced portion 520c and an unreinforced portion 520d. Except as otherwise described herein, the first thrust-bearing assembly 500c and its materials, elements, or components may be similar to or the same as any of the first thrust-bearing assembly 500, 500a and the second thrust-bearing assembly 550 (FIGS. 5 and 6A) and their respective materials, elements, and components.

In one embodiment, the reinforced portion 520c may include superhard bearing elements 510c, which may include superhard bearing surfaces 512c. Also, the superhard bearing elements 510c may have complementary shapes, such that a portion of one superhard bearing element 510c may fit about an adjacent superhard bearing element 510c. As such, the superhard bearing surfaces 512c may cover substantially all of a support ring 530c along the reinforced portion 520c.

Also, the first thrust bearing assembly 500c may include superhard bearing elements 210d, which may form one or more unreinforced portions, such as the unreinforced portion 520d. In one embodiment, the unreinforced portion 520d may have the same span angle as the reinforced portion 520c. Furthermore, examples may include the unreinforced portion 520d that has a lower bearing surface density than the reinforced portion 520c. One may appreciate that the superhard bearing elements 510d also may have complimentary shapes (similar to the superhard bearing elements 510c), such that adjacent corresponding bearing surfaces 512d thereof partially nest with one another.

Figure 6C:
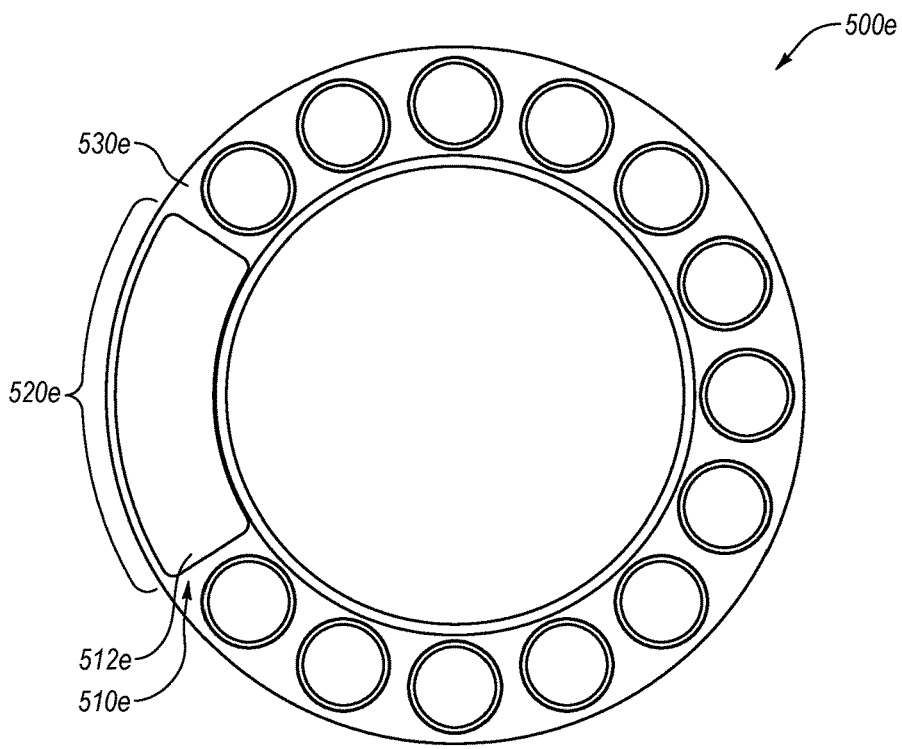
FIG. 6C is a top view of a thrust-bearing assembly according to yet another embodiment.

In yet another embodiment, illustrated in FIG. 6C, a first thrust bearing assembly 500e may include a reinforced portion 520e that may be formed by a single superhard bearing element 510e, which may have a substantially continuous or uninterrupted bearing surface 512e. Except as otherwise described herein, the first thrust-bearing assembly 500e and its materials, elements, or components may be similar to or the same as any of the first thrust-bearing assembly 500, 500a, 500c and the second thrust-bearing assembly 550 (FIGS. 5, 6A-6B) and their respective materials, elements, and components. It should be appreciated that the bearing surface 512e may cover substantially the entire support ring 530e at the reinforced portion 520e. Alternatively, the bearing surface 512e may cover only a portion of the support ring 530e at the reinforced portion 520e. Also, it should be appreciated that the bearing surface 512e may have any suitable shape, which may vary from one embodiment to another. In one instance, the bearing surface 512e may have an approximately arcuate shape.

Figure 7:
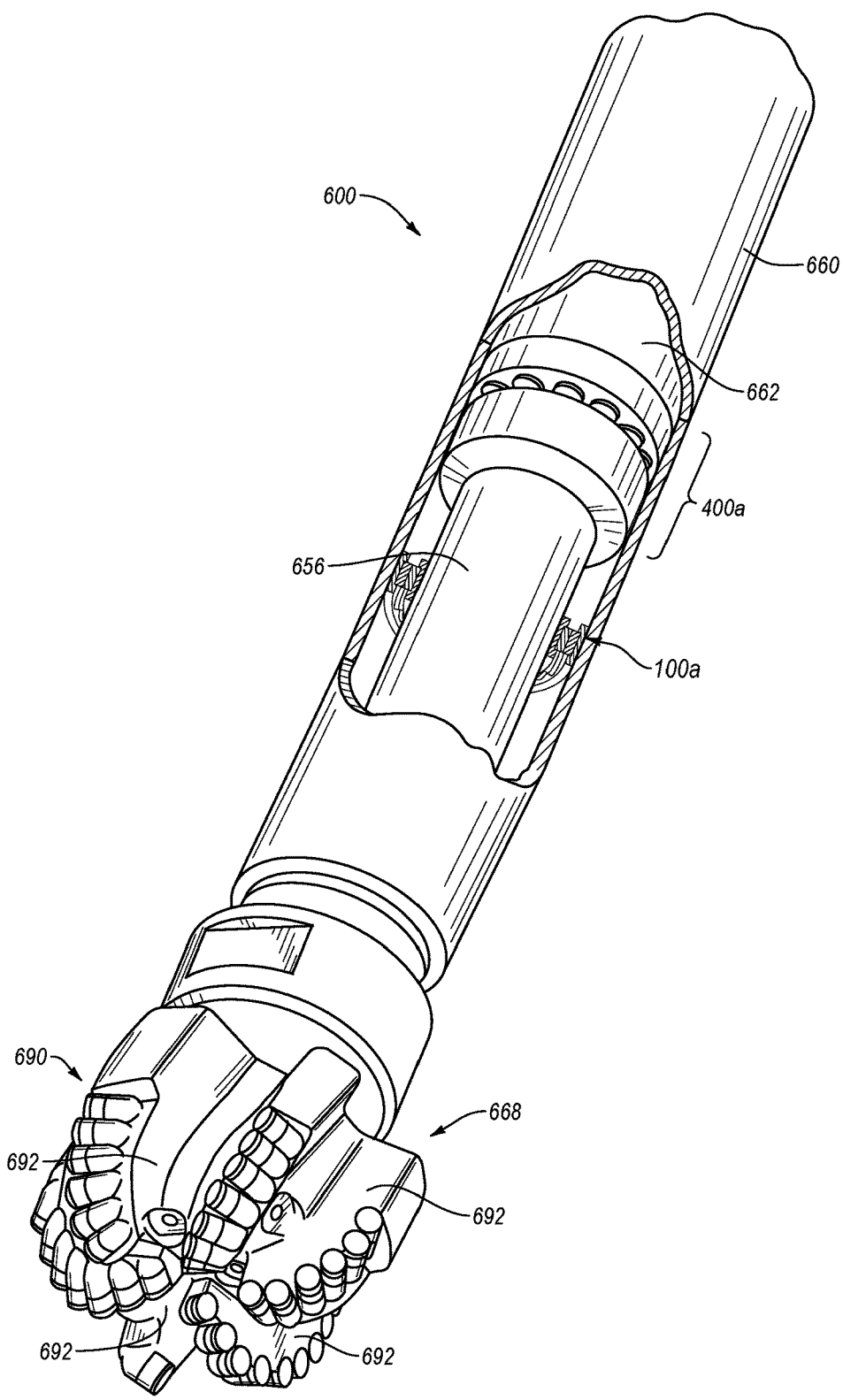
FIG. 7 is an isometric view of a subterranean drilling system in accordance with an embodiment.

Any of the embodiments for thrust-bearing apparatuses and radial bearing apparatuses discussed above may be used in a subterranean drilling system. FIG. 7 is a schematic isometric cutaway view of a subterranean drilling system 600 according to an embodiment. The subterranean drilling system 600 may include a housing 660 enclosing a downhole drilling motor 662 (i.e., a motor, turbine, or any other device capable of rotating an output shaft) that may be operably connected to an output shaft 656. A thrust-bearing apparatus 400a may be operably coupled to the downhole drilling motor 662. The thrust-bearing apparatus 400a may be configured as any of the previously described thrust-bearing apparatus embodiments (e.g., thrust-bearing apparatus 400 (FIG. 5).

Additionally or alternatively, the subterranean drilling system 600 may include a radial bearing apparatus 100a operably connected to the output shaft 656 and/or to the housing 660. The radial bearing apparatus 100a and its materials, elements, or components may be similar to or the same as the radial bearing apparatus 100 (FIG. 1) and its respective material, elements, and components. For instance, the radial bearing apparatus 100a may include first radial bearing assembly (e.g., a stator) and second radial bearing assembly (e.g., a rotor) that maybe operably connected to the housing 660 and to the output shaft 656, respectively. As noted above, the radial bearing assembly may be preferentially loaded on one or more sides thereof. In one example, the radial bearing assembly 100a may include one or more reinforced portions, which may have increased surface area that may provide enhanced support for the preferential loading of the reinforced portion (e.g., under the weight of the output shaft 656).

A rotary drill bit 668 may be configured to engage a subterranean formation and drill a borehole and may be connected to the output shaft 656. The rotary drill bit 668 is a fixed-cutter drill bit and is shown comprising a bit body 690 having radially-extending and longitudinally-extending blades 692 with a plurality of PDCs secured to the blades 692. However, other embodiments may utilize different types of rotary drill bits, such as core bits and/or roller-cone bits. As the borehole is drilled, pipe sections may be connected to the subterranean drilling system first thrust-bearing assembly 400a to form a drill string capable of progressively drilling the borehole to a greater size or depth within the earth.

In operation, drilling fluid may be circulated through the downhole drilling motor 662 to generate torque and rotate the output shaft 656 and the rotary drill bit 568 attached thereto so that a borehole may be drilled. A portion of the drilling fluid may also be used to lubricate opposing bearing surfaces of the stators and rotors of the radial bearing apparatus 100a and/or of the thrust-bearing apparatus 400a. In some operating conditions, as mentioned above, the drilling fluid may facilitate hydrodynamic operation of the radial bearing apparatus 100a and/or of the thrust-bearing apparatus 400a.

Although the bearing assemblies and apparatuses described above have been discussed in the context of subterranean drilling systems and applications, in other embodiments, the bearing assemblies and apparatuses disclosed herein are not limited to such use and may be used for many different applications, if desired, without limitation. Thus, such bearing assemblies and apparatuses are not limited for use with subterranean drilling systems and may be used with various mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A method of operating a bearing apparatus, the method comprising:
    providing a first bearing assembly having one or more first superhard bearing surfaces;
    engaging a second bearing assembly with the first bearing assembly, the second bearing assembly including:
        one or more second superhard bearing elements each of which includes a second superhard bearing surface, all of the second superhard bearing surface of each of the one or more second superhard bearing elements collectively defining a reinforced portion; and
        one or more third superhard bearing elements each of which includes a third superhard bearing surface, all of the third superhard bearing surface of each of the one or more third superhard bearing elements collectively defining an unreinforced portion, the reinforced portion having a higher bearing surface density than the unreinforced portion;
    wherein at least one of:
        a surface area of the second superhard bearing surface of each of the one or more second superhard bearing elements is greater than a surface area of the third superhard surface of any of the one or more third superhard bearing elements;
        the one or more second superhard bearing elements include a plurality of second superhard bearing elements that contact adjacent ones of the plurality of second superhard bearing elements and the one or more third superhard bearing elements include a plurality of third superhard bearing elements that are spaced from adjacent ones of the plurality of third superhard bearing elements; or
        the one or more second superhard bearing elements include a plurality of second superhard bearing elements and the one or more third superhard bearing elements include a plurality of third superhard bearing elements, and wherein a gap between adjacent ones of the plurality of second superhard bearing elements is less than a gap between adjacent ones of the plurality of third superhard bearing elements; and
    supporting a first portion of a total load by the reinforced portion and a second portion of the total load by the unreinforced portion.

2. The method of claim 1, wherein the first portion has a first percentage per degree load, the second portion has a second percentage per degree load, and the first percentage is greater than the second percentage.

3. The method of claim 1, wherein the first percentage is greater than about 0.3% per degree.

4. The method of claim 1, wherein the first percentage is less than about 9% per degree.

5. The method of claim 1, wherein each of the first and second bearing assemblies includes a thrust-bearing assembly.

6. The method of claim 1, wherein each of the first and second bearing assemblies includes a radial bearing assembly.

7. A method of operating a bearing apparatus, the method comprising:
    providing a first bearing assembly having one or more first superhard bearing surfaces;
    engaging a second bearing assembly with the first bearing assembly, the second bearing assembly including:
        a plurality of second superhard bearing elements distributed about an axis, each of the plurality of second superhard bearing elements having a second superhard material including a second superhard bearing surface;
        a reinforced portion that has a span angle defined by two reference lines intersecting at the axis, wherein a reinforced superhard bearing surface area is defined by each second superhard bearing surface entirely within the span angle and any portion of any other second superhard bearing surface partially within the span angle; and
        an unreinforced portion defined by a vertical angle of the span angle, wherein an unreinforced portion superhard bearing surface area is defined by each second superhard bearing surface entirely within the vertical angle and any portion of any other second superhard bearing surface partially within the vertical angle;

wherein the reinforced superhard bearing surface area is at least 8% greater than the unreinforced superhard bearing surface area; and supporting a first portion of a total load by the reinforced portion and a second portion of the total load by the unreinforced portion.

8. The method of claim 7, wherein the first portion has a first percentage per degree load, the second portion has a second percentage per degree load, and the first percentage is greater than the second percentage.

9. The method of claim 7, wherein the first percentage is greater than about 0.3% per degree.

10. The method of claim 7, wherein the first percentage is less than about 9% per degree.

11. The method of claim 7, wherein each of the first and second bearing assemblies includes a thrust-bearing assembly.

12. The method of claim 7, wherein each of the first and second bearing assemblies includes a radial bearing assembly.

13. The method of claim 7, wherein each of the plurality of second superhard bearing elements includes a superhard table including the second superhard material, the superhard table bonded to a substrate.

14. The method of claim 13, wherein the superhard tables of the plurality of second superhard bearing elements in the reinforced portion exhibit at least one of a greater thickness or thermal stability than the superhard tables of the plurality of second superhard bearing elements in the unreinforced portion.

15. The method of claim 7, wherein the span angle is between 5° and 72°.

16. The method of claim 7, wherein the reinforced superhard bearing surface area includes a substantially uninterrupted superhard bearing surface.

17. The method of claim 7, wherein:
the plurality of second superhard bearing elements collectively define a total bearing surface; and
the reinforced superhard bearing surface area defines at least 80% of the total bearing surface.

18. The method of claim 7, wherein the reinforced superhard bearing surface area is at least 15% greater than the first unreinforced superhard bearing surface area.

19. The method of claim 7, wherein the reinforced superhard bearing surface area is at least 35% greater than the first unreinforced superhard bearing surface area.

20. A method of operating a bearing apparatus; the bearing apparatus included in a system having a shaft operably coupled to the bearing apparatus; the bearing apparatus including a first bearing assembly and a second bearing assembly; the method comprising:

rotating the shaft to cause engagement of the second bearing assembly with the first bearing assembly, the second bearing assembly including:

a plurality of polycrystalline diamond bearing elements distributed about an axis, each of the plurality of polycrystalline diamond bearing elements having a polycrystalline diamond material including a polycrystalline diamond bearing surface;

a reinforced portion that has a span angle defined by two reference lines intersecting at the axis, wherein a reinforced polycrystalline diamond bearing surface area is defined by each polycrystalline diamond bearing surface entirely within the span angle and any portion of any other polycrystalline diamond bearing surface partially within the first span angle; and an unreinforced portion defined by a vertical angle of the span angle, wherein an unreinforced portion polycrystalline diamond bearing surface area is defined by each polycrystalline diamond bearing surface entirely within the vertical angle and any portion of any other polycrystalline diamond bearing surface partially within the vertical angle;

wherein the reinforced polycrystalline diamond bearing surface area is at least 8% greater than the unreinforced polycrystalline diamond bearing surface area; and supporting a first portion of a total load by the reinforced portion and a second portion of the total load by the unreinforced portion.

* * * * *